US008892882B2

(12) United States Patent
Liu et al.

(10) Patent No.: US 8,892,882 B2
(45) Date of Patent: Nov. 18, 2014

(54) CONTENT TRANSMISSION SECURITY PROTECTION DEVICE SYSTEM AND METHOD

(75) Inventors: Xianhong Liu, Sichuan (CN); Jinfeng Yang, Sichuan (CN); Hongjuan Kang, Sichuan (CN); Enyang Zhang, Sichuan (CN); Guangqing Zheng, Sichuan (CN); Yanyan Wang, Sichuan (CN); Xinfa Zhang, Sichuan (CN)

(73) Assignee: Sichuan Changhong Electric Co., Ltd., Mianyang, Sichuan (CN)

( * ) Notice: Subject to any disclaimer, the term of this patent is extended or adjusted under 35 U.S.C. 154(b) by 0 days.

(21) Appl. No.: 13/383,749

(22) PCT Filed: Nov. 26, 2009

(86) PCT No.: PCT/CN2009/075150
§ 371 (c)(1),
(2), (4) Date: Feb. 21, 2012

(87) PCT Pub. No.: WO2011/006326
PCT Pub. Date: Jan. 20, 2011

(65) Prior Publication Data
US 2012/0144200 A1 Jun. 7, 2012

(30) Foreign Application Priority Data

Jul. 16, 2009 (CN) .......................... 2009 1 0304410

(51) Int. Cl.
*H04L 29/06* (2006.01)
*H04L 9/32* (2006.01)
*H04L 9/08* (2006.01)

(52) U.S. Cl.
CPC ............ *H04L 9/0844* (2013.01); *H04L 9/3239* (2013.01); *H04L 9/32* (2013.01)
USPC ................ 713/168; 348/554; 726/26; 725/25

(58) Field of Classification Search
CPC ....................................................... H04L 9/32
USPC ......................................................... 713/171
See application file for complete search history.

(56) References Cited

U.S. PATENT DOCUMENTS 6,691,231 B1    2/2004  Lloyd et al.
2004/0174824 A1*  9/2004  Ohta et al. .................... 370/252
(Continued)

FOREIGN PATENT DOCUMENTS

CN    101527837 A    9/2009
CN    101588236 A    11/2009

OTHER PUBLICATIONS

International Search Report for PCT/CN2009/075150 dated Apr. 22, 2010.

*Primary Examiner* — Hadi Armouche
*Assistant Examiner* — Bryan Wright
(74) *Attorney, Agent, or Firm* — Caesar, Rivise, Bernstein, Cohen & Pokotilow, Ltd.

(57) ABSTRACT

The invention relates to information security technologies, provides a content security transmission device and a content security transmission system which separate data transmission function of a digital interface from data management and processing function thereof, and provides a content security transmission method based on the device and the system. The content security transmission protection device comprises digital interfaces and a management/processing unit, the management/processing unit is configured in a specific chip in the device, used for updating a revocation list stored therein and collecting information from downstream devices. A transmitting device and a forwarding device in the content security transmission protection system comprise digital interfaces and management/processing units. The invention employs software in the specific chip CPU to implement data management and processing function without increasing cost, thus being capable of increasing any functions, improving flexibility and expansibility of the system, and greatly reducing size and cost of digital interface chips, namely reducing the development difficulty. The digital interfaces only implement simple data transmission function at fast processing speed.

10 Claims, 3 Drawing Sheets

(56) References Cited

U.S. PATENT DOCUMENTS

| | | | |
|---|---|---|---|
| 2008/0134237 A1* | 6/2008 | Tu et al. | 725/38 |
| 2009/0102972 A1* | 4/2009 | Kurita et al. | 348/554 |
| 2009/0103470 A1 | 4/2009 | Candelore | |
| 2010/0169646 A1* | 7/2010 | Zhang et al. | 713/171 |
| 2010/0199298 A1* | 8/2010 | Kabuto et al. | 725/25 |

* cited by examiner

US 8,892,882 B2

CONTENT TRANSMISSION SECURITY PROTECTION DEVICE SYSTEM AND METHOD

FIELD OF THE INVENTION

The invention relates to information security technology, in particular to technologies for content security transmission between devices via high speed digital interfaces.

DESCRIPTION OF THE RELATED ART

A content security transmission protection system between terminals comprises a transmitting device, a forwarding device and a receiving device. Each device in the system generally has a digital interface (input interface or output interface) and a presentation/use unit module. The transmitting device refers to a device with network device management function and digital contents transmitted; the receiving device refers to a device capable of receiving and decrypting the digital contents via one or more digital interfaces; and the forwarding device has input and output functions, receives digital contents via one or more digital interfaces, and transmits the digital contents via one or more transmitting interfaces. Audio data, video data, etc. to be protected are transmitted between devices via the digital interfaces. With regard to a bilateral network, the digital interface has input function and output function. With regard to the digital interfaces of the transmitting device and the forwarding device, they need manage output network, functions, sizes, etc. of devices, control the behaviors of downstream output devices or behaviors of terminals in the network, and are responsible for implementation of some protocols and algorithms and data encryption/decryption processing. A same device can have various input interfaces and output interfaces. The presentation/use unit module is a possible use part of the digital contents, and mainly for user operations.

At present, two international standards HDCP and DTCP are mainly for protection of digital interface contents. The HDCP standard includes interfaces authentication, data encryption, information collection part and revocation list update etc. A public key of the HDCP is referred to as a KSV, and a private key is referred to as a Key. The KSV is a 40 bit digit including 20 0s and 20 1s. Suppose device A and device B are to be authenticated, the principle of authentication between HDCP interfaces is that the following equation is true:

$$\sum_{A_{KSV} \neq 0} B_{Keys} = \sum_{B_{KSV} \neq 0} A_{Keys}$$

The authentication method has the advantage of simple algorithm and disadvantage of small cracking operation amount. A variety of attacks on the authentication algorithm have emerged in the network. The algorithm proposed by the solution greatly improves the cracking operation volume. Stream ciphers are employed for data encryption of HDCP, and the method has the advantage of strong data processing capacity, and is especially suitable for encryption of data without high security requirements and encryption of high throughput data.

In terms of revocation list update, the HDCP employs RSA signatures. As the revocation list update is carried out in a digital interface, the RSA is implemented in a digital interface chip according to standard regulations, resulting in increased development difficulty and size of the chip.

The information collection part of the HDCP is to collect link count and link depth, and collect ID and public keys linking all downstream devices to the transmitting device. The protocol is complex, the volume of data to be transmitted is larger, the collection is time-consuming, occupies data bandwidth and affects performance when the size of a linking network is relatively large.

The DTCP is another digital interface content protection standard widely used in current data transmission. The DTCP mainly includes interface authentication, key exchange, data encryption, copy information control, revocation list update, etc. The interface authentication of the DTCP employs a general ECC-based authentication algorithm, and has the advantage of high security and disadvantages of complex development and large size of chips. Algorithms of the HDCP are also compatible in DTCP. In terms of the copy control information (CCI), the DTCP can only process the CCI stipulated specific to MPEG with a maximum of 6 authorities.

The interface authentication, the key exchange and the data encryption belong to data transmission function, and the revocation list update, the information collection, the copy control information, etc. belong to data management and processing function. The data management and processing function is carried out in digital interfaces, as the algorithm is very complex, resulting in increased development difficulty and size of chips, thus the cost of interface chips is very high. Meanwhile, the management function may need regular expansion, if chips are employed for the expansion, the management function can not be updated in case that production, thus the management function is inflexible. As the digital interfaces have to implement such two major functions as the data transmission function and the data management and processing function, requirements for performance and size of the digital interface chips are relatively high. For example, approximate 50 k logic gate may be consumed if the revocation list signature is implemented in the chips in an ECC way, which is more than the sum of all other functions of the digital interfaces.

SUMMARY OF THE INVENTION

A technical problem to be solved by the invention is to provide a content security transmission device and a content security transmission system which separate data transmission function of a digital interface from data management and processing function thereof, and provides a content security transmission method based on the device and the system.

A technical solution for solving the technical problem in the invention is a content security transmission protection device which comprises digital interfaces and a management/processing unit, and the management/processing unit is configured in a specific chip in the device;

the digital interface is used for performing an authentication between the management/processing unit and the digital interface at the request of the management/processing unit in the device; performing an authentication between the digital interface and a digital interface of another device; and performing key activation between two devices to obtain an encryption key, and using the encryption key as an initial key to encrypt contents of data and transmit the data; and the management/processing unit is used for initiating an authentication between the management/processing unit and the digital interface in the device; performing an authentication between the management/processing unit and a management/processing unit of another device; and updating a revocation list stored therein, and collecting information from downstream devices.

The specific chip in the device can be a master device chip or other separate specific chips except digital interface chips in the device. Software is employed in the specific chip CPU to implement data management and processing function, that is, the part with complex algorithm and the part needing regular update are separated, and a separate logic module is employed. Software is employed in the CPU to implement data management and processing function without increasing cost, thus being capable of increasing any function, improving flexibility and expansibility of the system, and greatly reducing size and cost of the digital interface chips, namely reducing the development difficulty. The digital interfaces only implement simple data transmission function at a fast processing speed without consuming resources for other complex operations, thus reducing development difficulty and development cost of the digital interfaces, and improving the processing performance thereof.

The content security transmission protection system comprises transmitting devices, forwarding devices and receiving devices, the transmitting device comprises digital interfaces and a management/processing unit, the forwarding device comprises digital interfaces and a management/processing unit, and the receiving device comprises digital interfaces and a presentation/use unit;

the digital interface is used for performing an authentication between the management/processing unit and the digital interface at the request of the management/processing unit in the device; performing an authentication between the digital interface and a digital interface of another device; and performing key activation between two devices to obtain an encryption key, and using the encryption key as an initial key to encrypt contents of data and transmit the data;

the management/processing unit is used for initiating an authentication between the management/processing unit and the digital interface in the device; performing an authentication between the management/processing unit and a management/processing unit of another device; and updating a revocation list stored therein, and collecting information from downstream devices; and the presentation/use unit is used for possible use of digital contents and accepting user operations.

Devices supported by the system functionally include three categories, i.e. transmitting devices, forwarding devices and receiving devices. The transmitting devices refer to devices with network device management function and digital contents transmitted, and generally include digital interfaces (input interfaces and output interfaces), management/processing units and some other modules (e.g. presentation/use unit); the receiving devices refer to devices capable of receiving and decrypting encrypted digital contents via one or more input interfaces, and include input interfaces or inactivated output interfaces, presentation/use units and optionally management/processing units; and the forwarding devices refer to devices having input and output functions, receive digital contents via one or more input interfaces, and then transmit the digital contents via one or more output interfaces, and are required to have management/processing units. That is, the management/processing unit is essential for the transmitting devices and the forwarding devices, and optional for the receiving devices which only have presentation function, such as computer monitors.

The content security transmission method comprises the following steps:

a. initiating, by the management/processing unit, of transmitter, an authentication between the management/processing unit of transmitter and the digital interface of transmitter; and initiating, by the management/processing unit, of receiver, an authentication between the management/processing unit of receiver and digital interface of receiver;

b. performing, an authentication between the digital interface of transmitter and the digital interface of receiver;

c. performing, an authentication between the management/processing unit of transmitter and the management/processing unit of receiver;

d. performing key activation between the digital interface of transmitter and the digital interface of receiver to obtain an encryption key;

e. transmitting, the digital interface of transmitter uses the encryption key as an initial key to encrypt contents of data and transmits the data to the digital interface of receiver; and judging, by the management/processing unit of transmitter, whether information collection is completed after the step c and before the step d, and collecting information if the information collection is not completed; judging whether revocation lists stored in the management/processing unit of transmitter and the management/processing unit of receiver are consistent, and updating the revocation list if the revocation lists stored in the management/processing unit of transmitter and the management/processing unit of receiver are not consistent; and proceeding to the step d if the information collection is completed and the revocation lists are consistent.

The revocation list stores public keys of devices, including public keys held by the digital interfaces of the devices and public keys held by the management/processing units of the devices. The authentications in the steps a, b and c are performed by judging legality of the public keys, that is, the authentication between the digital interface and the management/processing unit in a same device in the step a is implemented by judging the legality of a public key held by the digital interface and a public key held by the management/processing unit; the authentication between the digital interface of transmitter and the digital interface of receiver in the step b is implemented by judging the legality of a public key held by the digital interface of transmitter and a public key held by the digital interface of receiver; and the authentication between the management/processing unit of transmitter and the management/processing unit of receiver in the step c is implemented by judging the legality of a public key held by the management/processing unit of transmitter and a public key held by the management/processing unit, of receiver Types of public key revocation records stored in a revocation list correspond to revocation of an individual public key, revocation of a batch of public keys and revocation of a segmental public keys respectively, in which the revocation of a batch of public keys can be revocation of public keys of a batch or of a manufacturer, and the revocation is implemented by nonzero positions of the public keys. The revocation of a specific individual public key is implemented using the value of the public key. In terms of system-based legality authentication, an ID of a certificate is generally revoked. As contents of a certificate are numerous and the volume of data is large, the volume of data to be transmitted is large. In digital interface applications, two-way transmission capability is generally very weak. For example, HDMI only has an I2C low speed channel, and a two-way AUX channel of DisplayPort has the speed below 1% of the speed of a data channel. In the invention, the volume of data exchanged can be reduced to 10% of the volume implemented by the revocation of the ID of the certificate by directly revoking a public key.

In the step a, the authentication between the management/processing unit of transmitter and the digital interface of transmitter and the authentication between the management/processing unit of receiver and the digital interface of receiver are automatically performed when the transmitting device or the receiving device is electrified.

In the step a, the authentication between the management/processing unit of transmitter and the digital interface of transmitter and the authentication between the management/processing unit of receiver and the digital interface of receiver are authentication between the management/processing unit and the digital interface in the same device, and the authentication comprises:

a1. transmitting, by the digital interface of the device, the public key of the digital interface and a random number of the digital interface to the management/process unit of the same device;

a2. judging, by the management/processing unit, whether the public key of the digital interface exists in the revocation list stored in the management/processing unit, and the authentication failing if the public key of the digital interface exists in the revocation list stored in the management/processing unit; and transmitting, by the management/processing unit, the public key of the management/processing unit and a random number of the management/processing unit to the digital interface;

a3. judging, by the digital interface, whether the received public key of the management/processing unit exists in the revocation list stored in the management/processing unit of receiver through the management/processing unit, and the authentication failing if the received public key of the management/processing unit exists in the revocation list stored in the management/processing unit of receiver; generating, by the management/processing unit, a master key of the management/processing unit according to a private key of the management/processing unit, the public key of the digital interface, the random number of the management/processing unit and the random number of the digital interface; and generating, by the digital interface, a master key of the digital interface according to the private key of the digital interface, the public key of the management/processing unit, the random number of the management/processing unit and the random number of the digital interface if the received public key of the management/processing unit does not exist in the revocation list stored in the management/processing unit of receiver; and a4. judging whether the master key of the management/processing unit is the same as that of the digital interface, the authentication succeeding if the master key of the management/processing unit is the same as that of the digital interface, and the authentication failing if the master key of the management/processing unit is different from that of the digital interface.

In the step b, the revocation list of the public key of the digital interface is stored in the management/processing unit, the digital interface applies to the management/processing unit for verifying whether the public key of an object to be authenticated exists in the revocation list, the management/processing unit feeds back the results, and the authentication is not performed directly in the digital interface chip. The revocation list is not stored in the digital interface, which improves the flexibility without any restriction to the size of the revocation list, and the revocation list can be updated at any time. Meanwhile, no storage space is reserved in the chip, thus reducing the cost.

The authentication in the step b comprises:

b1. transmitting, by the digital interface of receiver, the public key of the digital interface of receiver and a random number of the digital interface of receiver to the digital interface of transmitter;

b2. handing, by the digital interface of transmitter, the public key of the digital interface of receiver over to the management/processing unit of transmitter, then judging, by the management/processing unit of transmitter, whether the pubic key of the digital interface of receiver exists in the revocation list stored in the management/processing unit of transmitter, and the authentication failing if the public key of the digital interface of receiver exists in the revocation list stored in the management/processing unit of transmitter; and transmitting, by the digital interface of transmitter, the public key of the digital interface of transmitter and a random number of the digital interface of transmitter to the digital interface of receiver if the public key of the digital interface of receiver does not exist in the revocation list stored in the management/processing unit of transmitter;

b3. handing, by the digital interface of receiver, the public key of the digital interface of transmitter over to the management/processing unit of receiver, and judging, by the management/processing unit of receiver, whether the public key of the digital interface of transmitter exists in the revocation list stored in the management/processing unit of receiver, and the authentication failing if the public key of the digital interface of transmitter exists in the revocation list stored in the management/processing unit of receiver; and generating, by the digital interface of transmitter, a master key of the digital interface of transmitter according to a private key of the digital interface of transmitter, the public key of the digital interface of receiver, the random number of the digital interface of transmitter and the random number of the digital interface of receiver; and generating, by the digital interface of receiver, a master key of the digital interface of receiver according to a private key of the digital interface of receiver, the public key of the digital interface of transmitter, the random number of the digital interface of transmitter and the random number of the digital interface of receiver if the public key of the digital interface of transmitter does not exist in the revocation list stored in the management/processing unit of receiver; and b4. judging whether the master key of the digital interface of transmitter is the same as that of the digital interface of receiver, the authentication succeeding if the master key of the digital interface of transmitter is the same as that of the digital interface of receiver, and the authentication failing if the master key of the digital interface of transmitter is different from that of the digital interface of receiver.

Data transmission in the authentication between the management/processing unit of transmitter and the management/processing unit of receiver in the step c relies on a communication link established during the authentication between the digital interface of transmitter and the digital interface of receiver in the step b. For example, an HDMI interface can establish an I2C communication link, and a DisplayPort interface can establish a communication link via an auxiliary channel.

The authentication in the step c comprises:

c1. transmitting, by the management/processing unit of receiver, the public key of the management/processing unit of receiver and a random number of the management/processing unit of receiver to the management/processing unit of transmitter;

c2. judging, by the management/processing unit of transmitter, whether the public key of the management/processing unit of receiver exists in the revocation list stored in the management/processing unit of transmitter, the authentication failing if the public key of the management/processing unit of receiver exists in the revocation list stored in the management/processing unit of transmitter; and transmitting, by the management/processing unit of transmitter, the public key of the management/processing unit of transmitter and a random number of the management/processing unit of transmitter to the management/processing unit of receiver if the public key of the management/processing unit of receiver does not exist in the revocation list stored in the management/processing unit of transmitter;

c3. judging, by the management/processing unit of receiver, whether the public key of management/processing unit of transmitter exists in the revocation list stored in the management/processing unit of receiver, the authentication failing if the public key of the management/processing unit of transmitter exists in the revocation list stored in the management/processing unit of receiver; and generating, by the management/processing unit of transmitter, a master key of the management/processing unit of transmitter according to a private key of the management/processing unit of transmitter, the public key of the management/processing unit of receiver, the random number of the management/processing unit of transmitter and the random number of the management/processing unit of receiver; and generating, by the management/processing unit of receiver, a master key of the management/processing unit of receiver according to the private key transmitted to the management/processing unit of receiver, the public key of the management/processing unit of transmitter, the random number of the management/processing unit of transmitter and the random number of the management/processing unit of receiver if the public key of the management/processing unit of transmitter does not exist in the revocation list stored in the management/processing unit of receiver; and c4. Judging whether the master key of the management/processing unit of transmitter is the same as that of the management/processing unit of receiver, the authentication succeeding if the master key of the management/processing unit of transmitter is the same as that of the management/processing unit of receiver, and the authentication failing if the master key of the management/processing unit of transmitter is different from that of the management/processing unit of receiver.

Compared to the authentication methods of the prior art, such authentication methods can help effectively improve authentication security while reducing the complexity and size of the digital interface chips.

Information collection is carried out by the management/processing unit instead of the digital interface. Information to be collected includes device capacity, link depth and link hierarchy. At present, the device capacity can not be collected by the HDCP and the DTCP, function lists of all devices can be collected in the invention, enhancing system functions. Meanwhile, the public keys are not uploaded to the transmitter, and controlled by the management/processing unit of each device, thus reducing the volume of data while implementing the same functions. And complex information collection protocol is transferred from the interface chips to the CPU for implementation, reducing development difficulty and size of the interface chips. The device capacity is represented by several bytes, the capacity is represented by a bit, 1 represents that the device has the capacity, and 0 represents that the device does not have the capacity. The information collection is carried out in the following ways: the management/processing unit judges whether a downstream device has a management/processing unit (if the downstream device does not exist, correspondingly downstream management/processing unit also does not exist), if the downstream device does not have a management/process unit, capacity of the device at this level only has presentation function, with the bit of 1. If the downstream device has a management/process unit, the capacity information of devices below this level and the capacity information of the device is subject to an OR operation according to the bit, and the result is used as the capacity information of all devices at and below this level. The capacity of the device is written in during production. Record types in the revocation list are divided into revocation of an individual public key, revocation of public keys of a batch or a manufacturer and revocation of a segmental public key. The revocation of a specific individual public key is implemented using the value of the public key.

Key activation is implemented by a common digit formed after the authentication in the step b (e.g. the master key of the digital interface (the master key of the transmitting end digital interface is the same as that of the receiving end digital interface)) or operation with the digit.

Synchronous key check and key update are carried out regularly in the step e, and the data content encryption and the key update are carried out in a parity key manner. Two keys are employed in the parity key manner, one key is updated when the other key is used. The two keys switch according to an appointed period, and the keys are switched while updating.

The advantages of the invention are as follows: the characteristics of implementation by chip hardware and software are fully used, the unification of low development difficulty, low size and cost, high performance and multifunction is implemented in the content security transmission technology, further, the authentication method of the invention ensures high security during the content security transmission process.

DETAILED DESCRIPTION OF THE PREFERRED EMBODIMENTS

I. System Structure
1. Topological Structure of the System
Devices conforming to the system include the following several parts:

(1) Multiple Digital Interfaces (Output Interfaces or Input/Output Interface Modules)

The multiple digital interfaces are mainly for outputting digital contents to other devices or network. With regard to a two-way network, etc., the same interface has input function and output function. The module can be responsible for encryption/decryption processing of data at the same time, and establishment of a communication link between management units. The same device can have various input interfaces.

(2) Management/Processing Unit

The management/processing unit mainly manages output network, functions and sizes of devices, etc., controls output behaviors or behaviors of terminals in the network, is responsible for implementation of some protocols and algorithms and some encryption processing, and is also responsible for management of own interfaces in the device. The functions of the management/processing unit are implemented outside the digital interfaces using software, for example, the CPU of a master chip is used, thus being capable of greatly reducing cost of the system.

(3) Presentation/Use Unit

The presentation/use unit is mainly a possible use part of digital contents, and mainly for user operations.

The management/processing unit is essential for transmitting devices and forwarding devices, and optional for receiving devices which only have presentation function, the transmitting devices and the forwarding devices may not have presentation or use unit module.

Figure 1:
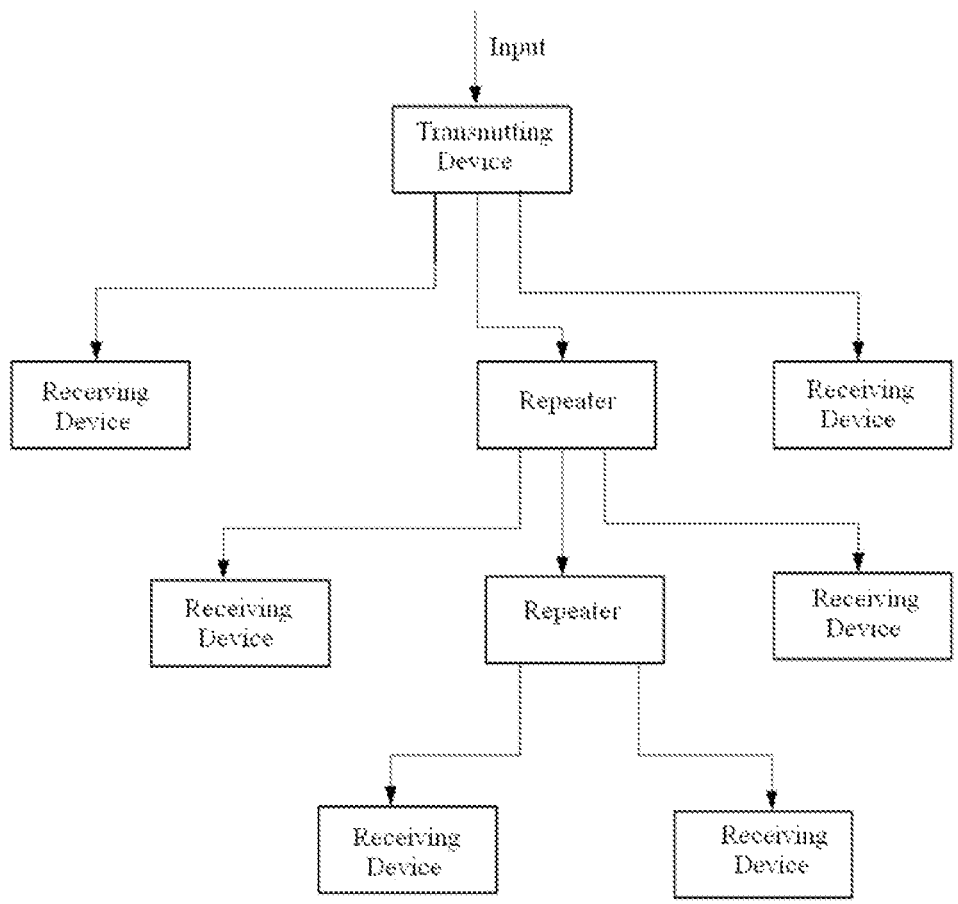
FIG. 1 is a tree topological structure.
Figure 2:
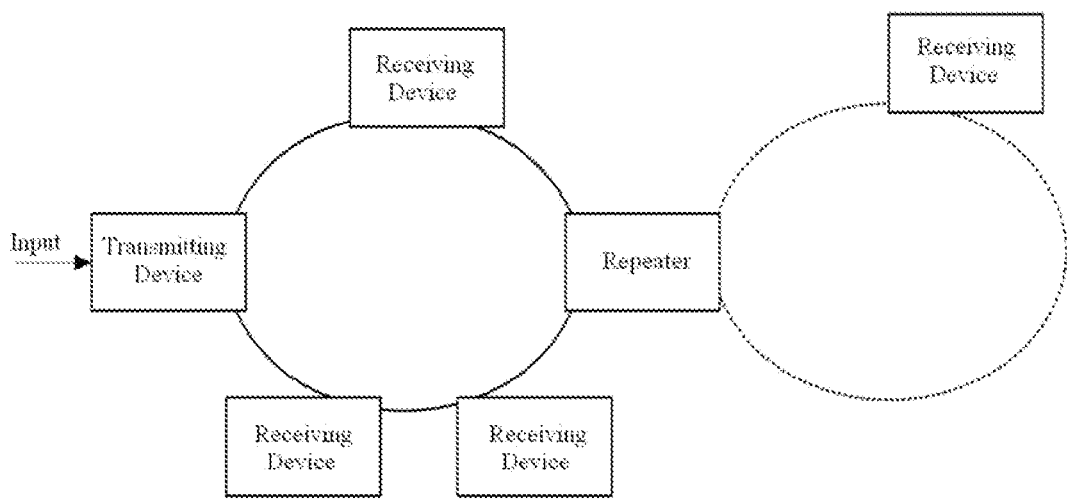
FIG. 2 is a network or bus topological structure.

The system supports two topological structures, i.e. the tree topological structure as shown in FIG. 1 and the network or bus topological structure as shown in FIG. 2.

In the tree topological structure, data is output from a transmitting device, can be directly output to a receiving device or a repeater, and output to other repeaters or receiving devices by the repeater. Among others, the transmitting device can control output scale, such as the quantity of terminals linked to the network and number of output stages. Meanwhile, the transmitting device can also decide which type of devices is not allowed to be networked, and control behaviors of the terminals in the network.

In the network or bus topological structure, data is output via a transmitting device, output to other devices via a network or a bus. Meanwhile, the network or the bus can have a forwarding device. The transmitting device can control the sizes of output terminals and the number of forwarding layers. The transmitting device has the same capacity as that of the tree topological structure.

2. System Overview

The system is mainly used for implementation of security transmission of digital contents via digital interfaces. A typical application of the system includes a transmitting device, one or more receiving devices, zero or more forwarding devices. The solution stipulates a group of operations to be completed by all parties participating in transmission of digital contents among the transmitting device, the forwarding device and the receiving device.

First, the device implements authentication process before content transmission, the authentication process is generally performed between directly linked devices, directly linked interfaces, etc., including authentication between the management/processing unit of the transmitting device and the forwarding device and own digital interface of the devices, authentication between the digital interface of two directly linked devices, and authentication between the management/processing unit of transmitter and the management/processing unit of receiver. After the authentication, if clearly no protection is required for digital contents to be transmitted, the digital contents can be transmitted directly; if protection is required for the digital contents to be transmitted or content protection mark can not be found, the digital contents are encrypted and then transmitted. Meanwhile, the system must maintain the integrity of the system at any time by updating the revocation list, and exclude revoked devices and interfaces from the system.

A basic workflow of the system is explained based on the example of transmitting digital contents by a device A and a device B via an interface A2 and an interface B1.

Figure 3:
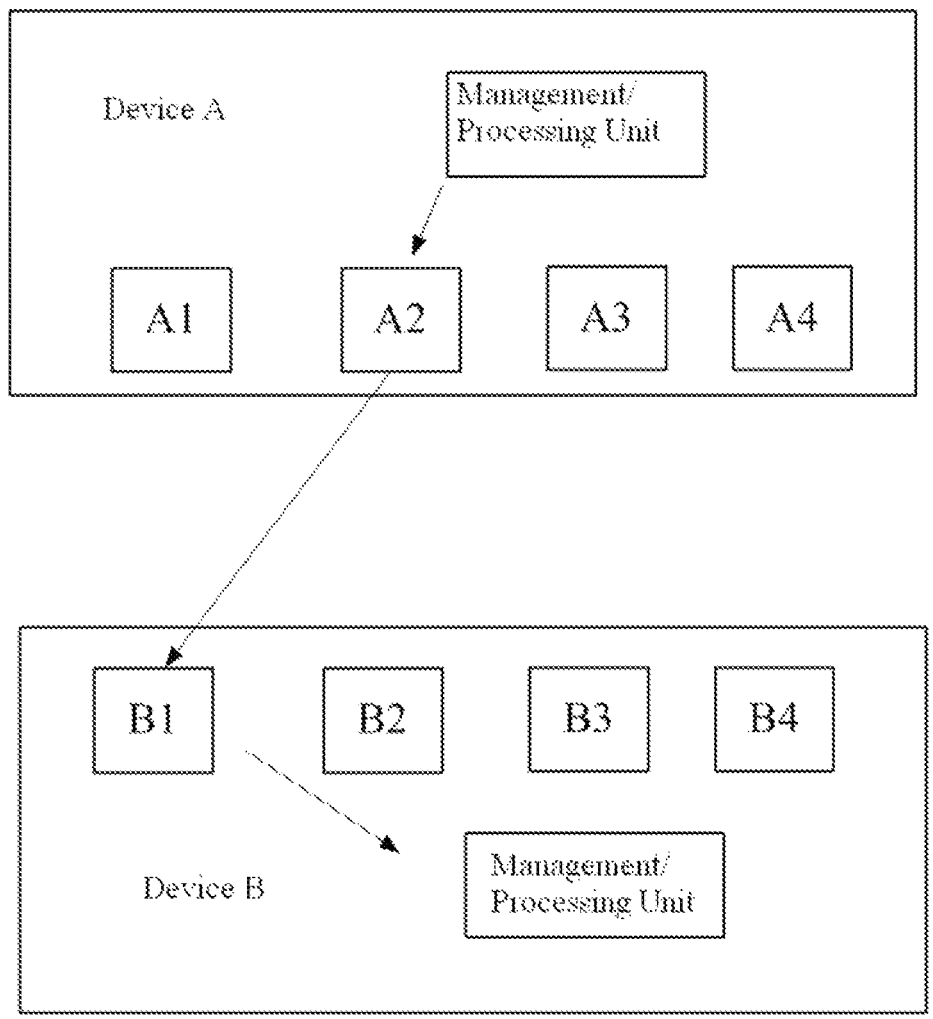
FIG. 3 is a schematic diagram of content flow of the system in an example.

FIG. 3 is a schematic diagram of content flow of the system. The digital contents flow from a management/processing unit of the device A to the interface A2 of the device A and the interface B1 of the device B, and reach a management/processing unit B.

After the device A and the device B are electrified, inter-authentication process of the devices is implemented, and the management/processing unit initiates an authentication between the management/processing unit and an interface thereof. If the device B does not have a management/processing unit, the inter-authentication process is not implemented.

When the electrified devices A and B are linked via an interface or the devices A and B linked via an interface are electrified, the interface A2 detects a hot plug detect signal (HPD signal) of the interface B1 or a broadcast signal, the two linked devices successively implement corresponding operations according to different states, in which the following operations implemented between the devices must be implemented after interface or network communication link connection is completed, and the interfaces at both devices refer only to interfaces of the same physical connection:

a) After the interface A2 detects that the HPD signal or broadcast signal is connected:

a1) if inter-authentication of the interface A2 is not completed, the inter-authentication process continues;

a2) if the inter-authentication of the interface A2 succeeds, the interface A2 initiates a two-way authentication between the interface A2 and the interface B1, a3) if the inter-authentication of the interface A2 is not completed successfully, and a content protection mark indicates that no protection is required for the contents, then the interface A2 directly transmits the digital contents to the interface B1; and a4) if the inter-authentication of the interface A2 is not completed successfully, and protection is required for the contents or no content protection mark is found, then it is prohibited to transmit the digital contents to the interface B1 via the interface A2.

b) after a two-way authentication between the interface A2 and the interface B1 and a two-way authentication between a management/processing unit of the device A and a management/processing unit of the device B are completed:

b1) if no protection is required for digital contents to be transmitted, the interface A2 directly transmits the digital contents to the interface B1, b2) if the authentications pass, and protection is required for the digital contents to be transmitted or no content protection mark is found, the interface A2 initiates a key activation between the interface A2 and the interface B1;

b3) if the authentications pass, and the versions of revocation lists stored in management/processing units at both devices are inconsistent, a revocation list update between the devices is implemented;

b4) if the authentications pass, and information collection process of the device A is not completed, then the device management unit A initiates a link information collection process; and b5) if the authentications do not pass, protection is required for the digital contents to be transmitted or no content protection mark is found, it is prohibited to transmit the digital contents to the interface B1 via the interface A2;

c) after key activation transmission between the interface A2 and the interface B1 is completed:

c1) if key activation succeeds, content encryption transmission process proceeds, the interface A2 encrypts and transmits the digital contents, and the interface B1 receives and decrypts the digital contents;

c2) if the key activation fails, and the frequency of failures is less than a specified frequency (e.g. three times), the interface A2 reinitiates a key activation between the interface A2 and the interface B1; and c3) if the key activation fails and the frequency of failures is more than the specified frequency, the interface A2 reinitiates a two-way authentication between the interface A2 and the interface B1.

d) when information collection is carried out between management/processing units:

d1) if information collection fails, and the frequency of failures is less than the specified frequency, a management/processing unit A reinitiates information collection between the management/processing unit A and a management/processing unit B; and d2) if information collection fails, and the frequency of failures is more than the specified frequency, then information collection process is terminated, and an information collection failure flag bit is set.

e) during content encryption transmission process:

e1) synchronous key check process is implemented in each line blanking period; and e2) if a key update period expires, the interface A2 implements a key update between the interface A2 and the interface B1.

f) during synchronous key check process:

f1) if synchronization is correct, content encryption transmission process continues; and f2) if synchronization is wrong, the interface A2 reinitiates key activation between the interface A2 and the interface B1.

II Specific Procedures

In the system, two communication participants identify legality of the identity each other, and a new shared key is established between the participants after identification passes.

In the following description, state bits of different registers are shown in the table below:

Definition of each state bit of a register $R_{MU}$ in the management/processing unit is as shown in Table 1, and the register $R_{MU}$ is used for storing identifications in the authentication process:

TABLE 1

| Name of state | Mark | Full name in English |
|---|---|---|
| Hot Plug Detect Flag | HPD | Hot Plug Detect Flag |
| Inter-Authentication Completed | IAC | Inter-Authentication Completed |
| Inter-Authentication Succeed | IAS | Inter-Authentication Succeed |
| IUM Update Completed | IUC | IUM Update Completed |
| IUM Update Succeed | IUS | IUM Update Succeed |
| Content Encryption Request | CER | Content Encryption Request |
| Information Collection Completed | ICC | Information Collection Completed |
| MU Authentication Completed | MAC | MU Authentication Completed |
| MU Authentication Succeed | MAS | MU Authentication Succeed |

Definition of each state bit of a register $R_{STAT}$ in the management/processing unit is as shown in Table 2, and the register $R_{STAT}$ is used for storing identifications in the information collection process:

TABLE 2

| Name of state | English mark | Full name in English |
|---|---|---|
| All IUM Update Completed | AIUC | All IUM Update Completed |
| All Information Collection Completed | AICC | All Information Collection Completed |
| All Inter-Authentication Completed | AIAC | All Inter-Authentication Completed |

TABLE 2-continued

| Name of state | English mark | Full name in English |
|---|---|---|
| All Inter-Authentication Succeed | AIAS | All Inter-Authentication Succeed |
| Link Depth | LD | Link Depth |
| Link Count | LC | Link Count |
| Max Cascade Exceeded | MCE | Max Cascade Exceeded |
| Max Devs Exceeded | MDE | Max Devs Exceeded |

Definition of each state bit of a register $R_{IN}$ in the digital interface is as shown in Table 3:

TABLE 3

| Name of state | English mark | Full name in English |
|---|---|---|
| Hot Plug Detect Flag | HPD | Hot Plug Detect Flag |
| Inter-Authentication Succeed | IAS | Inter-Authentication Succeed |
| Inter-Authentication Completed | IAC | Inter-Authentication Completed |
| Content Encryption Request | CER | Content Encryption Request |
| Outer-Authentication Completed | OAC | Outer-Authentication Completed |
| Outer-Authentication Succeed | OAS | Outer-Authentication Succeed |
| Key Activation Succeed | KAS | Key Activation Succeed |
| Stream Cipher Synchronization | SCS | Stream Cipher Synchronization |
| Having MU | HMU | Having MU |
| Public-key Is Legal | PIS | Public-key Is Legal |

1.1 Inter-authentication and Outer-authentication

Authentications of the system include inter-authentication and outer-authentication. The inter-authentication completes an authentication between the management/processing unit and the interface thereof in the device, and the inter-authentication process is initiated by the management/processing unit; and the outer-authentication includes an authentication between interfaces linked between two devices and an authentication between two management/processing units, and the interface authentication is initiated by a transmitting interface, and the authentication between management/processing units is initiated by a transmitting management/processing unit.

The procedures for implementation of the inter-authentication and the outer-authentication are similar, the distinction is that prerequisites for triggering implementation of the inter-authentication and the outer-authentication and updated state bits after implementation are different:

The inter-authentication: the management/processing unit of the device checks an IAC bit of the $R_{MU}$ corresponding to a specific interface. If the IAC bit is 0, the management/processing unit initiates a two-way authentication between the management/processing unit and the specific interface. If the authentication succeeds, the management/processing unit sets the IAS bit and the IAC bit of the $R_{MU}$ corresponding to the interface as 1, and the corresponding interface sets flag bits in an $R_{IN}$ as IAS=1 and IAC=1. If the authentication fails, the management/processing unit sets the IAS bit of the $R_{MU}$ corresponding to the interface as 0, and IAC bit as 1, and the corresponding interface sets flag bits in the $R_{IN}$ as IAS=0 and IAC=1.

Authentication between interfaces: after a transmitting interface of the transmitting device completes the inter-authentication (in the corresponding $R_{IN}$, IAS=1 and OAC=0), a two-way authentication between the transmitting interface and a receiving interface linked thereto is initiated. If the authentication succeeds, the transmitting interface and the receiving interface respectively set flag bits in respective $R_{IN}$ as OAC=1 and OAS=1. If the authentication fails, the transmitting interface and the receiving interface respectively set the flag bits in respective $R_{IN}$ as OAC=1 and OAS=0.

Authentication between management/processing units: after the authentication between interfaces is completed or during content security transmission, if information collection and/or revocation list (IUM) update need to be implemented, a two-way authentication between management/processing units needs to be implemented. If the authentication succeeds, the management/processing units respectively set flag bits in respective $R_{MU}$ as MAC=1 and MAS=1. If the authentication fails, the management/processing units respectively set the flag bits in respective $R_{MU}$ as MAC=1 and MAS=0.

1.1 Implementation Process of the Inter-authentication

In the implementation process of inter-authentication, suppose A is a management/processing unit (i.e. an authentication initiator) in the device, and B is a digital interface (i.e. an authentication responder) in the same device. Suppose a public key of the A is $\vec{p}_{A1}$ and a private key thereof is $\vec{s}_{A1}$, a public key of the B is $\vec{p}_{B1}$ and a private key thereof is $\vec{s}_{B1}$, and the A and the B keep a storage correlation coefficient $k_1$, an offset vector $\vec{e}_1$, a regression coefficient $a_1$ and a modulus $m_1$ secret.

The specific authentication process is as follows:

a) Implementing, by the initiator A, the following processes successively during the authentication process:

a1) reading, by the A, an ID of a local system and a system version number to form a message Mes1, transmitting the message Mes1 to the B, and implementing the next step after completion of transmission;

Contents of a protocol message contained in the message Mes1 are as follows:

Message ID∥system ID∥system version number

The symbol "∥" herein represents a bound symbol;

a2) waiting for a message Mes2 from B, after the A transmits the message Mes1, setting the maximum wait time T, and beginning timing, if the message Mes2 from B is received within the maximum wait time T, implementing the next step; otherwise implementing step a11);

a3) verifying whether the public key in the message Mes2 is legal: judging, by the A, whether the $\vec{p}_{B1}$ is in the IUM stored in the A, setting, by the management/processing unit, the flag bit IAS in the $R_{MU}$ as 0 if the $\vec{p}_{B1}$ is in the IUM, the authentication failing, and implementing step a11); otherwise implementing the next step;

a4) generating a random number $R_{A1}$, reading the public key $\vec{p}_{A1}$, forming a message Mes3 after cascading, transmitting the message Mes3 to the B, and implementing the next step after completion of transmission;

contents of a protocol message Mes3 are as follows:

Message ID∥$\vec{p}_{A1}$∥$R_{A1}$ a5) reading, by the A, authentication parameters, successively performing the following computations, and implementing the next step after completion of the computations;

a5-1) computing a vector product M1;

$$M1=k_1 \times (\vec{p}_{B1} \times \vec{s}_{A1}^T + \vec{p}_{B1} \times \vec{e}_1^T + a_1) \pmod{m_1}$$

a5-2) computing a master key K_M1;

$$K\_M1=M\_A(M1\|R_{A1}\|R_{B1}):$$

M_A herein represents an HASH algorithm, e.g. SHA-1 and HMAC;

a5-3) computing authentication codes $R_{11}$ and $R_{21}$:

$$R_{11}=M\_A(K\_M1\|R_{A1})$$

$$R_{21}=M\_A(K\_M1\|R_{B1})$$

a6) transmitting a message Mes4 containing the authentication code $R_{21}$ to the B, and implementing the next step after completion of transmission;

Contents of a protocol message Mes4 are as follows:

Message ID∥$R_{21}$ a7) waiting for a message Mes5, After the A completes the computations, setting a maximum wait time T, and beginning timing, if the message Mes5 returned from B is received within the maximum wait time T, implementing the next step; otherwise implementing the step a11);

a8) comparing whether the authentication code $R_{11}$ obtained in local computation is equal to the received $R_{11}'$, and transmitting a message MesS to the B if the authentication code $R_{11}$ obtained in the local computation is equal to the received $R_{11}'$, otherwise implementing the step a11);

Contents of a protocol message MesS are as follows:

Message ID∥SUCCEED

The value of SUCCEED flags contained in all SUCCEED messages and FAIL messages defined in the specification is 0, and the value of FAIL flags is 1, occupying one byte respectively.

a9) waiting for a message MesD, after the A completes the computations, setting the maximum wait time T, and beginning timing, if the message MesD from B is received within the maximum wait time T, implementing the next step; otherwise implementing the step a11);

a10) storing the master key K_M1, setting flag bits in the $R_{MU}$ as IAS=1 and IAC=1, and implementing no subsequent step in case that the authentication protocol is successfully implemented;

a11) checking whether frequency of continuous local authentication failures is less than a specified frequency: adding 1 to the frequency of authentication failures, and reinitiating a two-way authentication between the A and the B if the frequency of the continuous local authentication failures is less than the specified frequency; otherwise setting flag bits in the $R_{MU}$ as IAC=1 and IAS=0, and terminating the two-way authentication process in case that implementation failure of a two-way authentication protocol.

b) Implementing, by the responder B, the following processes successively during the authentication process:

b1) Reading the message Mes1, and then successively performing the next step;

b2) verifying whether an authentication protocol version is compatible, checking, by the B, whether the authentication protocol version is compatible with the locally supported protocol version according to the system ID and the system version number in the message Mes1, and implementing the next step if the authentication protocol version is compatible with the locally supported protocol version, otherwise implementing step b12);

b3) generating a random number $R_{B1}$, reading the locally stored public key $\vec{p}_{B1}$, forming a message Mes2 after cascading, transmitting the message Mes2 to the A, and implementing the next step after completion of transmission;

Contents of the protocol message Mes2 are as follows:

Message ID∥$\vec{p}_{B1}$∥$R_{B1}$ b4) Waiting to read a message Mes3 from A, after the B transmits the message Mes2, setting a maximum wait time T, and beginning timing, if the message Mes3 from A is received within the maximum wait time T, implementing the next step; otherwise implementing the step b12);

b5) verifying whether the public key in the message Mes3 is legal: judging, by B, whether the $\vec{p}_{A1}$ is in the IUM by accessing the IUM stored in the A, setting, by MU, the flag bit IAS in the $R_{IN}$ corresponding to the B as 0 if the $\vec{p}_{A1}$ is in the IUM, the authentication failing, and implementing the step b12), otherwise implementing the next step;

b6) Reading, by the B, authentication parameters, successively performing the following computations, and implementing the next step after completion of the computations;

b6-1) computing a vector product M1':

$$M1'=k_1 \times (\vec{p}_{A1} \times \vec{s}_{B1}{}^T + \vec{p}_{A1} \times \vec{e}_1{}^T + a_1) \quad (\text{mod } m_1)$$

b6-2) computing a master key K_M1';

$$K\_M1'=M\_A(M1', R_{A1} \| R_{B1})$$

b6-3) computing authentication codes $R_{11}'$ and $R_{21}'$:

$$R_{11}'=M\_A(K\_M1' \| R_{A1})$$

$$R_{21}'=M\_A(K\_M1' \| R_{B1})$$

b7) transmitting a message Mes5 containing the authentication code $R_{11}'$ to a corresponding storage area in the A, and implementing the next step after completion of transmission;

Contents of a protocol message Mes5 are as follows:
Message ID$\|R_{11}'$ b8) waiting to read a message Mes4, setting, by the B, the maximum wait time T, and beginning timing, if the message Mes4 returned from A is read within the maximum wait time T, performing the next step; otherwise performing the step b12);

b9) comparing whether the authentication code $R_{21}'$ is equal to the received $R_{21}$, transmitting a message MesD to the A if the authentication code $R_{21}'$ is equal to the received $R_{21}$, and implementing the next step after completion of transmission, otherwise implementing the step b12);

Contents of a protocol message are as follows:
Message ID$\|$SUCCEED b10) waiting to read a message MesS, setting, by the B, the maximum wait time T, and beginning timing, if the message MesS returned from A is received within the maximum wait time T, performing the next step; otherwise performing the step b12);

b11) Storing the master key K_M1', setting flag bits in a local register $R_{IN}$ as IAS=1 and IAC=1, and implementing no subsequent step in case that the authentication protocol is successfully implemented;

b12) checking whether frequency of continuous local authentication failures is less than a specified frequency: adding 1 to the frequency of authentication failures, and waiting for the A to reinitiate a two-way authentication process if the frequency of the continuous local authentication failures is less than the specified frequency; otherwise setting flag bits in a corresponding state register $R_{IN}$ in the device B as IAC=1 and IAS=0, and terminating the two-way authentication process in case that implementation failure of a two-way authentication protocol.

1.2 Implementation Process of the Authentication Between Interfaces

In the implementation process of the authentication between interfaces, suppose A is a digital interface of transmitter(i.e. an authentication initiator), and B is a digital interface of receiver (i.e. an authentication responder). Suppose a public key of the A is $\vec{p}_{A2}$ and a private key thereof is $\vec{s}_{A2}$, a public key of B is $\vec{p}_{B2}$ and a private key thereof is $\vec{s}_{B2}$, and the A and the B storage correlation coefficient $k_2$, an offset vector $\vec{e}_2$, a regression coefficient $a_2$ and a modulus $m_2$ secret.

The specific authentication process is as follows:

a) Implementing, by the initiator A, the following processes successively during authentication process:

a1) reading, by the A, the ID of a local system and a cascade of a system version number to form a message Mes1_INBiAuth, transmitting a message Mes1_INBiAuth to the B, and implementing the next step after completion of transmission;

Contents of a protocol message Mes1_INBiAuth are as follows:
Message ID$\|$system ID$\|$system version number a2) waiting for a message Mes2_INBiAuth returned from the B, after the A transmits the message Mes1_INBiAuth, setting a maximum wait time T_INBiAuthDelay, and beginning timing, if the message Mes2_INBiAuth returned from the B is received within the maximum wait time T_INBiAuthDelay, implementing the next step; otherwise implementing the step a11);

a3) verifying whether the public key in the message Mes2_INBiAuth is legal, judging, by the management/processing unit $MU_A$ in the device A, whether the $\vec{p}_{B2}$ is in the $IUM_A$: setting, by the $MU_A$, the flag bit PIS in the $R_{IN}$ corresponding to the A as 0 if the $\vec{p}_{B2}$ is in the $IUM_A$, otherwise setting the PIS as 1; inquiring, by the A, the value of a flag bit PIS within the T_INBiAuthDelay, considering the B as an illegal interface if the value of the PIS is inquired to be 0 within the T_INBiAuthDelay, the authentication failing, and implementing the step a11), otherwise implementing the next step;

Where, the management/processing unit of the device can obtain the $\vec{P}_{B2}$ by inquiry, or can be informed after an interface receives the $\vec{P}_{B2}$.

a4) generating a random number $R_{A2}$, reading the locally stored public key $\vec{p}_{A2}$, forming a message Mes3_INBiAuth after cascading, transmitting a message Mes3_INBiAuth to the B, and implementing the next step after completion of transmission;

Contents of a protocol message Mes3_INBiAuth are as follows:

Message ID$\|\vec{p}_{A2}\|R_{A2}$ a5) reading, by the A, locally stored authentication parameters, successively performing the following computations, and implementing the next step after completion of the computations;

a5-1) computing a vector product M2:

$$M2=k_2 \times (\vec{p}_{B2} \times \vec{s}_{A2}{}^T + \vec{p}_{B2} \times \vec{e}_2{}^T + a_2) \quad (\text{mod } m_2)$$

a5-2) computing a master key K_M2;

$$K\_M2=M\_A(M2 \| R_{A2} \| R_{B2}):$$

a5-3) computing authentication codes $R_{12}$ and $R_{22}$:

$$R_{12}=M\_A(K\_M2 \| R_{A2})$$

$$R_{22}=M\_A(K\_M2 \| R_{B2})$$

a6) transmitting a message Mes4_INBiAuth containing the authentication code $R_{22}$ to the B, and implementing the next step after completion of transmission;

Contents of a protocol message Mes4_INBiAuth are as follows:

Message ID‖$R_{22}$ a7) waiting for a message Mes5_INBiAuth, after the A completes the above computations, setting the maximum wait time T_INBiAuthDelay, and beginning timing, if a message Mes5_INBiAuth returned from the B is received within the T_INBiAuthDelay, implementing the next step; otherwise implementing the step a11);

a8) comparing whether the authentication code $R_{12}$ obtained in local computation is equal to the received $R_{12}$, and transmitting a message MesS_INBiAuth_Succeed to the B if the authentication code $R_{12}$ obtained in local computation is equal to the received $R_{12}$, otherwise implementing the step a11);

Contents of a protocol message MesS_INBiAuth_Succeed are as follows:

Message ID‖SUCCEED

The value of SUCCEED flags contained in all SUCCEED messages and FAIL messages defined in the specification is 0, and the value of FAIL flags is 1, occupying one byte respectively.

a9) waiting for a message MesD_INBiAuth_Succeed, after the A completes the computations, setting the maximum wait time T_INBiAuthDelay, and beginning timing, if the message MesD_INBiAuth_Succeed from the B is received within the T_INBiAuthDelay, implementing the next step; otherwise implementing the step a11);

a10) storing the master key K_M2, setting flag bits in a local register $R_{IN}$ as OAC=1 and OAS=1, and implementing no subsequent step in case that the authentication protocol is successfully implemented;

a11) checking whether frequency of continuous local authentication failures is less than a specified frequency: adding 1 to the frequency of authentication failures, and reinitiating a two-way authentication between the A and the B if the frequency of the continuous local authentication failures is less than specified frequency; otherwise setting flag bits in a corresponding state register $R_{IN}$ in the device A as OAC=1 and OAS=0, and terminating the two-way authentication process in case that implementation failure of a two-way authentication protocol.

b) Implementing, by the responder B, the following processes successively during the authentication process:

b1) Reading the Mes1_INBiAuth, and then successively implementing the next step;

b2) verifying whether the authentication protocol version is compatible, checking, by B, whether the authentication protocol version is compatible with the locally supported protocol version according to the system ID and the system version number in the message Mes1_INBiAuth, and implementing the next step if the authentication protocol version is compatible with the locally supported protocol version, otherwise implementing the step b12);

b3) generating a random number $R_{B2}$, reading the locally stored public key $\vec{p}_{B2}$, forming a message Mes2_INBiAuth after cascaded, transmitting the message Mes2_INBiAuth to the A, and implementing the next step after completion of transmission;

Contents of a protocol message Mes2_INBiAuth are as follows:

Message ID‖$\vec{p}_{B2}$‖$R_{B2}$ b4) Waiting to read a message Mes3_INBiAuth returned from the A, after B transmits the message Mes2_INBiAuth, setting, by the B, a maximum wait time T_INBiAuthDelay, and beginning timing, if the message Mes3_INBiAuth from the A is received within the T_INBiAuthDelay, implementing the next step; otherwise implementing the step b12);

b5) verifying whether the public key in the message Mes3_INBiAuth is legal, judging, by the management/processing unit $MU_B$ in the device B, whether the $\vec{p}_{A2}$ is in the $IUM_B$: setting, by the management/processing unit $MU_B$, the flag bit PIS in $R_{IN}$ corresponding to the B as 0 if $\vec{p}_{A2}$ is in the $IUM_B$, otherwise setting the PIS as 1; inquiring, by the B, the value of the flag bit PIS within T_INBiAuthDelay/2, considering the A as an illegal interface if the value of the PIS is inquired to be 0 within the T_INBiAuthDelay/2, the authentication failing, and implementing the step b12), otherwise implementing the next step;

b6) reading, by the B, locally stored authentication parameters, successively performing the following computations, and implementing the next step after completion of the computations;

b6-1) computing a vector product M2':

$$M2'=k_2\times(\vec{p}_{A2}\times\vec{s}_{B2}{}^T+\vec{p}_{A2}\times\vec{e}_2{}^T+a_2) \quad (\mathrm{mod}\ m_2)$$

b6-2) computing a master key K_M2';

$$K\_M2'=M\_A(M2', R_{A2}\|R_{B2})$$

b6.-3) computing authentication codes $R_{12}'$ and $R_{22}'$:

$$R_{12}'=M\_A(K\_M2'\|R_{A2})$$

$$R_{22}'=M\_A(K\_M2'\|R_{B2})$$

b7) transmitting a message Mes5_INBiAuth containing the authentication code $R_{12}'$ to a corresponding storage area of the A, and implementing the next step after completion of transmission;

Contents of a protocol message Mes5_INBiAuth are as follows:

Message ID‖$R_{12}'$ b8) waiting to read a message Mes4_INBiAuth, setting, by the B, the maximum wait time T_INBiAuthDelay, and beginning timing, if the message Mes4_INBiAuth returned from the A is read within the T_INBiAuthDelay, implementing the next step; otherwise implementing the step b12);

b9) comparing whether the authentication code $R_{22}'$ obtained in local computation is equal to the received $R_{22}$, transmitting a message MesD_INBiAuth_Succeed to the A if the authentication code $R_{22}'$ obtained in local computation is equal to the received $R_{22}$, and implementing the next step after completion of transmission, otherwise implementing the step 12);

Contents of a protocol message are as follows:

Message ID‖SUCCEED b10) Waiting to read the message MesS_INBiAuth_Succeed, setting, by the B, the maximum wait time T_INBiAuthDelay, and beginning timing, if the message MesS_INBiAuth Succeed returned from the A is received within the T_INBiAuthDelay, implementing the next step; otherwise implementing the step b12);

b11) storing the master key K_M2, setting flag bits in a local register $R_{IN}$ as OAC=1 and OAS=1, and implementing no subsequent step in case that the authentication protocol is successfully implemented;

b12) checking whether frequency of continuous local authentication failures is less than a specified frequency: adding 1 to the frequency of authentication failures, and waiting for the A to reinitiate a two-way authentication process if the frequency of the continuous local authentication failures is less than the specified frequency; otherwise setting flag bits in a corresponding state register $R_{IN}$ in the device B as OAC=1 and OAS=0, and terminating the two-way authentication process in case that implementation failure of a two-way authentication protocol.

1.3 Implementation Process of the Authentication Between Management/Processing Units After the authentication between interfaces is completed, a one-way data channel or a two-way data channel of the interfaces is employed to provide a data channel for the management/processing units. For example, an I2C channel can be used for data transmission in case that HDMI, and a AUX channel can be used for transmission in case that DisplayPort. The management/processing unit inquires the value of a flag bit HMU in the transmitting interface register $R_{IN}$ on the link. If HMU=1, the authentication between management/processing units is implemented.

In the system, the implementation process of the two-way authentication between management/processing units is basically the same as that of the two-way authentication between interfaces, and differences include legality check of public keys, settings of flag bits and name of protocol messages. In the implementation process of the authentication between management/processing units, suppose A is a management/processing unit of transmitter (i.e. an authentication initiator), and B is a management/processing unit of receiver (i.e. an authentication responder). Suppose a public key of the A is $\vec{p}_{A3}$ and a private key thereof is $\vec{s}_{A3}$, a public key of the B is $\vec{p}_{B3}$ and a private key thereof is $\vec{s}_{B3}$, and the A and the B storage correlation coefficient $k_3$, an offset vector $\vec{e}_3$, a regression coefficient $a_3$ and a modulus $m_3$ secret.

The specific authentication process is as follows:

a) Implementing, by the initiator A, the following processes successively during the authentication process:

a1) reading, by A, the ID of a local system and a cascade of an MU system version number to form a message Mes1_MUBiAuth, transmitting the message Mes1_MUBiAuth to the B, and implementing the next step after completion of transmission;

Contents of a protocol message Mes1_MUBiAuth are as follows:

Message ID∥system ID∥system version number a2) waiting for a message Mes2_MUBiAuth transmitted from the B, after the A transmits the message Mes1_MUBiAuth, setting a maximum wait time T_MUBiAuthDelay, and beginning timing, if the message Mes2_MUBiAuth returned from the B is received within the T_MUBiAuthDelay, implementing the next step; otherwise implementing the step 11);

a3) verifying whether the public key in the message Mes2_MUBiAuth is legal, and judging, by the A, whether $\vec{p}_{B3}$ is in the $IUM_A$, considering the B illegal if $\vec{p}_{B3}$ is in the $IUM_A$, the authentication failing, and implementing the step a11), otherwise implementing the next step;

a4) generating a random number $R_{A3}$, reading the locally stored public key $\vec{p}_{A3}$, forming a message Mes3_MUBiAuth after cascading, transmitting the message Mes3_MUBiAuth to the B, and implementing the next step after completion of transmission;

Contents of a protocol message Mes3_MUBiAuth are as follows:

Message ID∥$\vec{p}_{A3}$∥$R_{A3}$ a5) reading, by the A, locally stored authentication parameters, successively performing the following computations, and implementing the next step after completion of the computations;

a5-1) Computing a vector product M3:

$$M3 = k_3 \times (\vec{p}_{B3} \times \vec{s}_{A3}^T + \vec{p}_{B3} \times \vec{e}_3^T + a_3) \pmod{m_3}$$

a5-2) computing a master key K_M3;

$$K\_M3 = M\_A(M3 \| R_{A3} \| R_{B3}):$$

a5-3) computing authentication codes $R_{13}$ and $R_{23}$:

$$R_{13} = M\_A(K\_M3 \| R_{A3})$$

$$R_{23} = M\_A(K\_M3 \| R_{B3})$$

a6) Transmitting a message Mes4_MUBiAuth containing the authentication code $R_{23}$ to the B, and implementing the next step after completion of transmission;

Contents of a protocol message Mes4_MUBiAuth are as follows:

Message ID∥$R_{23}$ a7) waiting for a message Mes5_MUBiAuth, after the A completes the computations, setting the maximum wait time T_MUBiAuthDelay, and beginning timing, if the message Mes5_MUBiAuth returned from the B is received within the T_MUBiAuthDelay, implementing the next step; otherwise implementing the step a11);

a8) Comparing whether the authentication code $R_{13}$ obtained in local computation is equal to the received $R_{13}'$, and transmitting a message MesS_MUBiAuth_Succeed to the B if the authentication code $R_{13}$ obtained in the local computation is equal to the received $R_{13}'$, otherwise implementing the step a11);

Contents of a protocol message MesS_MUBiAuth_Succeed are as follows:

Message ID∥SUCCEED

The value of SUCCEED flags contained in all SUCCEED messages and FAIL messages defined in the specification is 0, and the value of FAIL flags is 1, occupying one byte respectively.

a9) Waiting for a message MesD_MUBiAuth_Succeed, after the A completes the computations, setting the maximum wait time T_MUBiAuthDelay, and beginning timing, if the message MesD_MUBiAuth_Succeed from the B is received within the T_MUBiAuthDelay, implementing the next step; otherwise implementing the step a11);

a10) setting flag bits in a local register $R_{MU}$ as MAC=1 and MAS=1, and implementing no subsequent step in case that the authentication protocol is successfully implemented;

a11) verifying whether the frequency of continuous local authentication failures is less than specified frequency: adding 1 to the frequency of authentication failures, and reinitiating a two-way authentication between the A and the B if the frequency of continuous local authentication failures is less than 3; otherwise setting flag bits in a corresponding state register $R_{MU}$ in the device A as MAC=1 and MAS=0, and terminating the two-way authentication process in case that implementation failure of a two-way authentication protocol.

b) Implementing, by the responder B, the following processes successively during the authentication process:

b1) Reading the message Mes1_MUBiAuth, and then successively implementing the next step;

b2) verifying whether the authentication protocol version is compatible, checking, by B, whether the authentication protocol version is compatible with the locally supported protocol version according to the system ID and the system version number of the management/processing unit in the message Mes1_MUBiAuth, and implementing the next step if the authentication protocol version is compatible with the locally supported protocol version, otherwise implementing the step b12);

b3) Generating a random number $R_{B3}$, reading the locally stored public key $\vec{p}_{B3}$, forming a message Mes2_MUBiAuth after cascading, transmitting the message Mes2_MUBiAuth to the A, and implementing the next step after completion of transmission;

Contents of protocol message Mes2_MUBiAuth are as follows:

Message ID$\|\vec{p}_{B3}\|R_{B3}$ b4) waiting to read the message Mes3_MUBiAuth returned from the A, after B transmits the message Mes2_MUBiAuth, setting the maximum wait time T_MUBiAuthDelay, and beginning timing, if the message Mes3_MUBiAuth of the A is received within the T_MUBiAuthDelay, implementing the next step; otherwise implementing the step b12);

b5) verifying whether the public key in the message Mes3_MUBiAuth is legal, and judging, by the B, whether the $\vec{p}_{A3}$ is in $IUM_B$, considering the A illegal if $\vec{p}_{A3}$ is in the $IUM_B$, the authentication failing, and implementing the step b12), otherwise implementing the next step;

b6) reading, by the B, locally stored authentication parameters, successively performing the following computations, and implementing the next step after completion of the computations;

b6-1) computing a vector product M3':

$$M3'=k_3\times(\vec{p}_{A3}\times\vec{s}_{B3}{}^T+\vec{p}_{A3}\times\vec{e}_3{}^T+\vec{a}_3) \quad (\mathrm{mod}\ m_3)$$

b6-2) computing a master key K_M3';

$$K\_M3'=M\_A(M3', R_{A3}\|R_{B3})$$

b6-3) computing authentication codes $R_{13}'$ and $R_{23}'$:

$$R_{13}'=M\_A(K\_M3'\|R_{A3})$$

$$R_{23}'=M\_A(K\_M3'\|R_{B3})$$

b7) transmitting a message Mes5_MUBiAuth containing the authentication code $R_{13}'$ to a corresponding storage area of the A, and implementing the next step after completion of transmission;

Contents of a protocol message Mes5_MUBiAuth are as follows:
Message ID$\|R_{13}'$ b8) waiting to read the message Mes4_INBiAuth, setting, by the B, the maximum wait time T_MUBiAuthDelay, and beginning timing, if the message Mes4_MUBiAuth returned from the A is read within the T_MUBiAuthDelay, implementing the next step; otherwise implementing the step b12);

b9) comparing whether the authentication code $R_{23}'$ obtained in the local computation is equal to the received $R_{22}$, transmitting the message MesD_MUBiAuth_Succeed to the A if the authentication code $R_{23}'$ obtained in local computation is equal to the received $R_{22}$, and implementing the next step after completion of transmission, otherwise implementing the step b12);

Contents of a protocol message are as follows:
Message ID$\|$SUCCEED b10) waiting to read the message MesS_MUBiAuth_Succeed, setting, by the B, the maximum wait time T_MUBiAuthDelay, and beginning timing, if the message MesS_MUBiAuth_Succeed returned from the A is received within the T_MUBiAuthDelay, implementing the next step; otherwise implementing the step b12);

b11) setting flag bits in a local register $R_{MU}$ as MAC=1 and MAS=1, and implementing no subsequent step in case that the authentication protocol is successfully implemented;

b12) checking whether frequency of continuous local authentication failures is less than a specified frequency: adding 1 to the frequency of authentication failures, and waiting for the A to reinitiate a two-way authentication process if the frequency of the continuous local authentication failures is less than the specified frequency; otherwise setting flag bits in a corresponding state register $R_{MU}$ in the device B as MAC=1 and MAS=0, and terminating the two-way authentication process in case that implementation failure of a two-way authentication protocol.

2 Information Collection

The information collection defined in the system is carried out by the management/processing unit instead of the interface, and the interface only establishes a communication link to cooperate with the management/processing unit to complete the information collection. Contents to be collected include functions of all downstream devices besides the quantity of terminals, link hierarchy, etc. Meanwhile, the ID or the public key of each device is not uploaded so as to reduce the volume of data, and the revocation list of the management/processing unit directly judges legality and validity of the interface. An information collection mechanism of the DTCP is similar to that of the HDCP, the signature uses the ECC algrithom, and the implementation of the ECC signature is very complex in the digital interface, with a very large size. The signature of the solution can receive any public keys signature, and is implemented in the CPU via software, thus effectively reducing complexity and difficulty.

After completion of all authentications in the device (AIAC=1, AIAS=1), the management/processing unit of transmitter checks the value of the flag bit AICC of $R_{STAT}$. If AICC=0, the management/processing unit in the device alternately checks the values of flag bits OAC, OAS of $R_{IN}$ in each activated transmitting interface and the value of ICC in the corresponding local $R_{MU}$ at a certain time interval $T_{INTER}$. If OAC=1, OAS=1 and ICC=0, the management/processing unit of transmitter initiates the information collection between the management/processing unit of transmitter and a receiving device on the transmitting interface link to collect link topology information and device capacity information of all activated downstream devices of the link. After the information collection is successfully completed on all activated transmitting interface links, the flag bit AICC in the $R_{STAT}$ is set as 1, and the information collection process of the device is completed.

The link topology information includes link count (LC) and link depth (LD), and the device capacity information is fields for characterizing the capacity of a device.

2.1 Information Collection Protocol

During the implementation of an information collection protocol, the management/processing unit inquires the value of the flag bit HMU in a transmitting interface register $R_{IN}$ on the link. If HMU=0, the LC and the LD obtained on the link are set as LC=0 and LD=1, and device capacity information is not collected. If HMU=1, the information collection between management/processing units is implemented.

If a device having the management/processing unit does not have linked downstream device, capacity information of the device is directly collected, the LC and the LD are set as LC=1 and LD=1, and the flag bit AICC in the $R_{STAT}$ is set as AICC=1, and the information collection process of the device is completed.

In the information collection between management/processing units, the topmost device is defined as layer 0, the layers of linked downstream devices are progressively increased in sequence, the collection process of the LC, the LD and the device capacity is as follows:

a) LC(n) is defined as the link count stored in the management/processing unit in a device A at layer n, the numerical value thereof is equal to the sum of the LC stored in management/processing units of all directly linked downstream devices plus the number of all directly linked devices, and the computing formula is as follows:

$$LC(n) = \sum_{i=0}^{k-1} LC(n+1)_i + k \tag{1}$$

Where, n is the layer at which the device is located, $1 \leq n \leq 6$, LC(n+1), is the LC stored in the management/processing unit of an $i^{th}$ device at layer n+1, and k is the number of the directly linked downstream devices of the device A. The LC value of the bottom device (without linked downstream device) is set as 0.

b) LD(n) is defined as the link depth stored in the management/processing unit of a device A at layer n, the numerical value thereof is equal to the maximum value of the LD stored in management/processing units of all the directly linked downstream devices plus 1, and the computing formula is as follows:

$$LD(n) = MAX(LD(n+1)_i) + 1 \tag{2}$$

Where, n is the layer at which the device is located, $1 \leq n \leq 6$, LD(n+1), is the LD stored in the management/processing unit of an $i^{th}$ device at layer n+1, $0 < i \leq k$, and k is the number of directly linked downstream devices of the device A. The LD value of the bottom device is set as 1.

c) Downstream device capacity fields stored in the management/processing unit of a device A at layer n are obtained through bit or operation of capacity fields of local devices and capacity fields stored in management/processing units of all directly linked downstream devices. Device capacity fields stored in the management/processing unit of the bottom device is the capacity field of the device.

In the system, after the device collects all information of a link on which a downstream transmitting interface is arranged, the flag bit ICC in the $R_{MU}$ corresponding to the link is set as 1, and the flag bit AICC in the $R_{STAT}$ is set as 1 after collecting information of all downstream links.

After a device collects all link information of downstream devices thereof, the management/processing unit judges whether the downstream LC and LD exceed limits, MCE and MDE in the $R_{STAT}$ are set as MCE=0 and MDE=0 if the downstream LC and LD do not exceed limits, and encryption transmission is allowed to continue; otherwise the MCE and/or the MDE in the $R_{STAT}$ are set as MCE=1 and/or MDE=1, and it is prohibited to continue transmission of digital contents to the downstream devices; and the value of LDF (LDF defines allowable device functions) of collected device capacity is judged. If any unallowed receiving device (determined by the LDF value) is found, it is prohibited to continue transmission of the digital contents to the downstream devices. The LDF is a function field of a linked device, and defined herein as 3 or more than 3 bytes, each bit defines a function of the device, and 3 bytes have 24 functions. In terms of the copy control information (CCI defines device functions allowed or not) of the prior art, the DTCP can only process the CCI control stipulated specific to MPEG, with a maximum of 6 authorities. The solution defines 24 basic authorities, meanwhile, as the authorities are controlled by software, the authorities can be expanded as required.

2.1 Information Transmission

After the management/processing unit of transmitter starts the information collection, the value of the flag bit AICC in the register $R_{STAT}$ of the management/processing unit in a directly linked downstream device is alternately inquired at a certain time interval. If AICC=1, the information transmission process is initiated. Suppose A is a management/processing unit of transmitter and B is a management/processing unit of receiver, and the A and the B implement the process as follows:

a) Implementing, by the A, the following processes successively during the information transmission:

a1) transmitting a message Mes1_INUdICCol to the B;

Contents of a protocol message Mes1_INUdICCol are as follows:

Message ID||Rand_Source_Info||$P_A$

Where, Rand_Source_Info is obtained by computing a random number generation algorithm Rand().

a2) reading Mes2_INUdICCol; after the A transmits the message Mes1_INUdICCol, setting, by the A, a maximum wait time T_INUdICColDelay, and beginning timing, if the message Mes2_INUdICCol returned from the B is received within the T_INUdICColDelay, implementing the next step; otherwise implementing the step a4).

a3) verifying an M_A hash value contained in the message Mes2_INUdICCol: if the verification passes, updating the locally stored LC and LD and capacity field LDF of the downstream devices, and setting the flag bit in the corresponding local $R_{MU}$ as ICC=1; and implementing the step a4) if the verification fails.

Computations to be carried out in the verification of the M_A hash value are as follows:

a3-1) computing 256-bit key K_M_Info;

Computing formula of the K_M_Info is as follow:

K_M_Info=K_G(K_$M_{MU}$, fixed string)

a3-2) computing M_A (K_M_Info||Rand_Source_Info||LC||LD||LDF) hash value.

a4) if the frequency of continuous failures is less than the specified frequency, re-initiating the information collection between the A and the B, otherwise considering the implementation of information transmission between the A and the B to be failed, and setting the flag bit in the corresponding local $R_{MU}$ as ICC=0.

a5) Implementing, by the B, the following processes successively during the information transmission:

a5-1) waiting, by the B, to read a message Mes1_INUdICCol, and implementing the next step after receiving the message Mes1_INUdICCol; and a5-2) transmitting the message Mes2_INUdICCol to the A.

Contents of a protocol message Mes2_INUdICCol are as follows:

Message ID||LC||LD||LDF||M_A (K_M_Info||Rand_Source_Info||LC||LD||LDF)

3 Key Activation

The key activation process is typical of the solution. Once encryption and decryption are not synchronous, reauthentication is required, consuming more time. In the solution, the key activation is separated. When keys are not synchronized and the encryption needs to be interrupted temporally or begins, the key activation is performed directly, and authentication is not needed, saving processing time and achieving better user experience.

The key activation is performed by input and output interfaces.

After successfully completing the interface authentication between interfaces (OAC=1 and OAS=1), a transmitting interface checks values of flag bits CER and KAS of a local interface state register $R_{IN}$, and the key activation between corresponding receiving interfaces is initiated if CER=1 and KAS=0. For the key activation process, the master key K_M2 established after the successful authentication between interfaces is used to generate an encryption key K_E. After the key activation, the K_E can be used as an initial value of a subsequent communication encryption key, and when a parity key is used, the K_E is taken as an initial value of an odd key or even key.

Suppose an interface A is a key activation initiator, and an interface B is a key activation responder. The specific activation process is as follows:

a) performing, by the initiator A, the following processes successively during the key activation process:

a1) generating a random number Rand_Act_Source=Rand( ), and transmitting a message Mes1_INSiKAct to the B;

Contents of a protocol message Mes1_INSiKAct are as follows:

Message ID||Rand_Act_Source a2) receiving a message Mes2_INSiKAct; after the A transmits the message Mes1_INSiKAct, setting a max wait time T_INSiKActDelay, and beginning timing, if the message Mes2_INSiKAct returned from the B is read within the time T_INSiKActDelay, implementing the next step; otherwise implementing step a7);

a3) computing the master key K_E: according to the received message Mes2_INSiKAct, computing the K_E, and implementing the next step after the computation; and computing formula of the K_E is as follows:

$$K\_E = M\_A(K\_M2 \| Rand\_Act\_Sink \| Rand\_Act\_Source)$$

where, K_M2 is the master key generated after the authentication between interfaces, and kept by both authentication parties.

a4) verifying an M_A hash value contained in the message Mes2_INSiKAct; recomputing the M_A (K_E||Rand_Act_Sink) according to the content transmitted in the message Mes2_INSiKAc and the computed K_E, and comparing the read M_A hash value to the computed M_A hash value; if such two values are identical, implementing the next step; otherwise implementing the step a7).

a5) transmitting a message MesS_INSiKAct_Succeed to a corresponding storage area of the B, and implementing the next step after completion;

Contents of a protocol message MesS_INSiKAct_Succeed are as follows:

Message ID||SUCCEED a6) keeping the K_E, setting a flag bit KAS of a state bit register $R_{IN}$ of the interface A as 1, and completing the key activation protocol successfully;

a7) if frequency of continuous key activation failures is less than a specified frequency, re-initiating the key activation process, or setting the flag bits of the state bit register $R_{IN}$ of the interface as OAC=0, OAS=0 and KAS=0, terminating the key activation process and re-initiating the two-way authentication between the A and the interface B.

b) Performing, by the responder B, the following processes successively during the key activation process:

b1) receiving the message Mes1_INSiKAct, and then implementing the next step;

b2) generating a new random number Rand_Act_Sink=Rand( ), computing a key K_E', and implementing the next step after the computation;

Computing formula of the K_E' is as follows:

$$K\_E' = M\_A(K\_M2 \| Rand\_Act\_Sink \| Rand\_Act\_Source)$$

Where, K_M2 is the master key generated after the authentication between interfaces, and kept by both authentication parties;

b3) transmitting the message Mes2_INSiKAct to a corresponding storage area of the A, and implementing the next step after completion;

Contents of a protocol message Mes2_INSiKAct are as follows:

Message ID||Rand_Act_Sink||M_A (K_E'||Rand_Act_Sink)

b4) setting, by the B, the max wait time T_INSiKActDelay, and beginning timing, if the message MesS_INSiKAct_Succeed is read within the time T_INSiKActDelay, implementing the next step; otherwise implementing the step b6);

b5) keeping the K_E, setting the flag bit KAS of the state bit register $R_{IN}$ of the interface B as 1, and completing the key activation protocol successfully;

b6) if the frequency of the continuous key activation failures is less than the specified frequency, waiting the interface A to re-initiate the key activation process, or setting the flag bits of the state bit register $R_{IN}$ of the local interface as OAC=0, OAS=0 and KAS=0, terminating the key activation process and waiting the interface A to reinitiate the authentication process.

4 Security Transmission

For authentication algorithm of the solution, security is several magnitudes higher than the HDCP, and has simpler development and significantly decreased chip size compared with the DTCP. For content encryption, the DTCP employs the block encryption algorithm which consumes great resources, and is applicable to the cases with high security requirements and low data throughput. In the solution, the block encryption and stream cipher are compatible, and different algorithms are employed for different cases, meeting different needs.

After successful inter-interface key activation of both transmission parties (KAS=1), an encryption module is initiated for encryption transmission of digital contents. The K_E generated by the key activation is used as an initial value of the encryption key.

When the interfaces of both transmission parties detect local ISI0, ISI1 and ISI2 are 0 simultaneously, the security transmission is implemented according to an agreed encryption algorithm.

During the security transmission, the encryption key and an integrity key are employed to complete the secrecy transmission of the digital contents requiring protection, and complete transmission of protective flags and control information related to the digital contents. Meanwhile, the encryption key and the integrity key are regularly updated simultaneously.

Usually two keys are used for the encryption, that is, an odd key and an even key. When the odd key is in use, the even key is updated; and when the even key is in use, the odd key is updated. The time shifting of the key is performed at a certain time interval.

The block encryption algorithm and the stream cipher algorithm used herein are taken as examples below respectively to explain the security transmission process of the system.

4.1 Block Encryption Algorithm 4.1.1 Encryption

Encryption process in which an interface of transmitter uses the block encryption algorithm is as follows:

a) detecting several registers of ISI (Interface State Information), and only when the ISI0, the ISI1 and the ISI2 are 0, calling the following algorithm to complete data encryption processing:

$$B\_E(K\_Ei, [IV], data)$$

Description of parameters of the encryption algorithm: K_Ei: the encryption key, where i=[Key_Counter]lsb0; IV: an initialization vector (optional); data: data to be encrypted;

b) after completion of each encryption, setting, by the transmitting end interface, Cipher_Counter or Channel_Cipher_Counter as follows:

$$Cipher\_Counter = Cipher\_Counter + Length(data)$$

$$Channel\_Cipher\_Counter = Channel\_Cipher\_Counter + Length(data)$$

c) after completing the setting, computing Key_Counter++ if the Cipher_Counter or the Channel_Cipher_Counter overflows;

d) if the Cipher_Counter or Channel_Cipher_Counter are more than a specified value (e.g. 220), computing a backup key as follows:

$$K\_Ej = B\_E(K\_M_{lsb128 \sim 255}, K\_E \| Key\_Counter)$$

Where j=[K_Counter]lsb0⊕1, with j as a bit variable of 1, ⊕ representing bit specific OR operation, and $K\_M_{lsb128 \sim 255}$ representing low 128-255 bits of the K_M;

e) if the value of Key_Counter is more than ReAuthenticationMaxTime, for unicast encryption, setting authentication state of the interface as no authentication; for broadcast encryption or network encryption, generating a broadcast key again to perform the key activation.

4.1.2 Decryption

Decryption process in which the receiving end interface uses the block decryption algorithm is as follows:

a) detecting the ISI, and only when the ISI0, the ISI1 and the ISI2 are 0 simultaneously, calling the following algorithm to complete data decryption processing:

$$B\_D(K\_Ei, [IV], data)$$

Description of parameters of the decryption algorithm: K_Ei: a decryption key, where i=[Key_Counter]lsb0; IV: an initialization vector (optional); data: data to be decrypted;

b) after completion of each decryption, setting, by the interface of receiver, a cipher text counter Cipher_Counter or Channel_Cipher_Counter according to type of the source interface (4.1.1b));

c) after completing the setting, computing the Key_Counter++ if the Cipher_Counter or Channel_Cipher_Counter overflows;

d) if the Cipher_Counter or Channel_Cipher_Counter is more than the specified value (e.g. 220), computing a backup key according to type of the transmitting end interface (4.1.1d)), and placing new backup keys K_E and K_MAC in a storage area with j=[K_Counter]lsb0⊕1 as an index;

e) if the value of the Key_Counter is more than ReAuthenticationMaxTime, processing according to (4.1.1e) of the transmitting interface;

f) if the decryption fails, recording, by the counter D_W_Counter, the frequency of the failing decryptions, if the frequency is more than the D_W_Max, considering that an attack occurs to the current security transmission, or the keys of the both parties are unmatched, then performing the key activation process again.

4.2 Stream Cipher Algorithm 4.2.1 Encryption

Encryption process in which the interface of transmitter uses the stream cipher algorithm is as follows:

a) detecting the ISI, and only when the ISI0, the ISI1 and the ISI2 are 0 simultaneously, applying a key data recognition algorithm to generate key data location information of the frame data;

b) applying the stream cipher algorithm to encrypt a frame data;

$$S\_E(K\_E, [IV], Data)$$

Description of parameters of the encryption algorithm: K_E: an encryption key; IV: an optional initialization vector; data: data to be encrypted.

c) modifying the key data location information according to the stream cipher algorithm, and then extracting cipher text of each key location to form KDI_Record, if the KDI_Record is not null, setting a 1 bit integrity flag S_A=1, or setting S_A=0, d) computing the hash value:

$$[M\_A(K\_MAC, S\_A \| KDI\_Record)]_{lsb0-127}$$

the $[M\_A(K\_MAC, S\_A \| KDI\_Record)]_{lsb0-127}$ represents low 0-127 bits of the M_A;

e) packaging the received bit hash value, and transmitting the value to the interface of receiver after connecting the value with the S_A in series in the data frame cipher text;

f) after the transmission, processing the Cipher_Counter, the Channel_Cipher_Counter and the Key_Counter according to the processing mode of the encryption steps b)-e) in 4.1.1.

4.2.2 Decryption

Decryption process in which the interface of receiver uses the stream cipher algorithm is as follows:

a) detecting the ISI, and only when the ISI0, the ISI1 and the ISI2 are 0 simultaneously, calling the following algorithm to complete the data decryption:

$$S\_D(K\_E, [IV], Data)$$

Description of parameters of the decryption algorithm: K_E: a decryption key; IV: an optional initialization vector; data: data to be decrypted;

b) detecting the value of the S_A, if b1) S_A=1, applying the key data recognition algorithm to obtain key data location information, modifying the key data location information according to the stream cipher algorithm, and extracting the cipher text of the key location to form the KDI_Record; then computing the hash value according to the encryption process d) of the interface of transmitter in 4.2.1;

b2) S_A=0, computing the hash value according to the encryption process d) of the interface of transmitter in 4.2.1;

c) comparing the computed hash value with the received hash value; if such two values are identical, considering the decryption is a success, or considering the decryption is a failure;

d) after the successful decryption, processing the Cipher_Counter, the Channel_Cipher_Counter and the Key_Counter according to the processing mode of the decryption steps b)-e) in 4.1.2;

e) after the failing decryption, processing the D_W_Counter according to the decryption process f) by the AES-CCM algorithm in 4.1.2.

Usually, the stream cipher algorithm is used for obtaining a high encryption processing speed, and is applicable for data frame transmission with strict synchronizing signals. Concurrent operation of the key data location recognition, the hash value computation and the encryption can be implemented in a hardware. Concurrent processing of the decryption operation, the key data location recognition and the hash value computation can be implemented by caching the cipher text with a certain length.

4.3 Ciphertext package

The cipher packaging format herein is as follows:

System flag||encryption flag||[integrity flag]||cipher text

Where, the integrity flag is optional, and is essential when using the stream cipher algorithm in 4.1.2 and providing data integrity.

For application to a specific interface, the packaging can be encoded again according to transmission bandwidth of the interface, and then the packaging mode is capable of presenting all information before encoding.

4.4 Stream Cipher Update

During the data security transmission, the stream cipher must be updated in the transmitter and the receiver in real-time to ensure randomness of output key flow.

Firstly, the value of the K_E is used as an odd key or even key, and then at a certain agreed moment (e.g. the beginning of a vertical blanking interval), a number is used in both the transmitter and the receiving receiver to update another key which serves as the encryption and decryption key in the next time period. After the decryption key is used for a certain time period, the transmitter and the receiver simultaneously use another key for encryption and decryption, and update the key again at the same time, and this is repeated again and again.

5 System Integrity

An integrated security system ensures all devices and interfaces therein are legal. An issuing entity places public keys held by the illegal devices in a revocation list (the legality of the devices is identified by the legality of the public keys held by the management/processing unit in the devices), and places the public keys held by the illegal interfaces in the revocation list, and organizes to sign and issue the revocation list regularly.

Herein, any device with the management/processing unit and can be accessed to the system must support the storing and updating functions of the revocation list. Each management/processing unit has an independent and large enough storage area for storing the revocation list, the update thereof is performed between the management/processing units of two devices linked directly, and the update process is initiated by the management/processing units of a pair of linked transmitter.

5.1 Format and Verification of the Revocation List in the System

The revocation list format specified for the system is as shown in Table 12, all data in the revocation list are stored in the format of Big-Endian, and format and discription of the revocation list are as shown in Table 4.

TABLE 4

| Name | Data length (bit) | Description |
| --- | --- | --- |
| System identifier | 8 | Identification of the message for the system |
| Type | 3 | Types of messages updated, now only the IUM of type 0 is defined, and other values are reserved |
| Reserve | 5 | Bytes reserved, undefined and all set to 0 |
| Version number | 16 | A successively increasing integer representing time sequence of issuing the revocation list, which is increased from 1 successively, so the later the issue time is, the larger the version number is |
| Issuer ID | 24 | ID of issuer of the revocation list |
| Revocation list length | 32 | An integer representing the whole revocation list length, in byte |
| Public key revocation record list | Variable | One or more revocation records, with each revocation record format shown in Table 5 |
| Signature | 384 | The valid signature of the revocation list issuer for all above the information |

The public key revocation record list includes one or more revocation records with variable length. The format and implication of the revocation list are as shown in Table 5:

TABLE 5

| Public key revocation record type (PRRT) | Revocation record format | Actually revoked public key | Remarks |
| --- | --- | --- | --- |
| 0x00 | 0x00||revoked public key | Public key of an individual device/interface with the public key as the "revoked public key" | The revoked public key is 128 bits. |
| 0x01 | 0x01||revoked public key batch No. or manufacturer ID. | All public keys corresponding to all public keys with batch No. or "manufacturer ID" as the "revoked public key" | One record can revoke all public keys in one batch of a manufacturer |
| 0x02 | 0x02||revoked public key start No., revoked public key end No. | All public keys with the public keys in the interval [revoked public key start No., revoked public key end No.] | One record can revoke all public keys in one area |
| Other types | PRRT|| revoked content | Undefined, reserved | All revoked contents are set to zero |

In which the length of the "public key revocation record type" is 8 bits. The public key revocation record types in the system are the 0x00, the 0x01 and the 0x02, corresponding to revocation of an individual public key, revocation of a batch of public keys and revocation of a segmental public keys respectively, and the formats of other types are not defined temporarily. For revocation of public keys of a batch or of a manufacturer, nonzero location of the public keys are employed for implementation. For revocation of the specific public keys, values of the public keys are employed. The revocation of the public keys of a batch or a manufacturer using nonzero locations of the public keys is: suppose the revocation list type is the 0x01, and one revocation batch No. therein is 0130201020 (suppose the public key length is 10 digits herein), all public keys characterized by the 0XX0X0X0X0 are revoked (herein X represents an arbitrary value).

In the system, before storage and update of any revocation list, the validity of the revocation list is verified firstly. For any revocation list during transmission, a CA public key certificate of the revocation list must be carried. The CA public certificate can be a root certificate, or a public key certificate held by one corresponding authorized second CA.

5.2 Two-Way Update of Revocation List

After completion of all inter-authentications of the device (AIAC=1, AIAS=1), the management/processing unit of transmitter checks the value of the flag bit AIUC of the $R_{STAT}$. If AIUC=0, the management/processing unit of transmitter checks the values of flag bits OAC, OAS of $R_{IN}$ in each activated transmitting interface and the value of IUC of the corresponding $R_{MU}$. If OAC=1, OAS=1 and IUC=0, the management/processing unit of transmitter initiates the revocation list update process between the management/processing unit of transmitter and the management/processing unit of receiver in the link corresponding to the transmitter. When the revocation list update process is completed successfully in all activated transmitting end links, the flag bit AIUC of the $R_{STAT}$ as AIUC=1, and the update process of the IUM (revocation list) of the device is completed.

A revocation list update protocol for two-way communication is employed for the revocation list update process between the management/processing units. During the specific process, suppose A is the management/processing unit of transmitter, and B is the management/processing unit of receiver.

Both the A and the B use the master key $K\_M_{MU}$ generated after the authentication to compute the common revocation list transmission authentication key K_IUM (256 bits) as follows:

$$K\_IUM=K\_G(K\_M_{MU}, \text{"Key for } DICP\text{-}IN\text{-}IUM\text{-}Update\text{-}Message\text{"})$$

Where, the parameter "Key for DICP-IN-IUM-Update-Message" in the K_IUM computation is a fixed character string constants, or can be instead of other fixed strings.

The A and the B set continuous update failures counter in the local storage area for counting frequency of the failing revocation list update, and a initialized value is 0. The implementation process of the two-way IUM update specified herein is as follows:

a) performing, by the initiator A, the following processes successively during the two-way revocation list update process:

a1) transmitting a message Mes1_INBiIUMUp to the B, and then implementing the next step;

Contents of a protocol message Mes1_INBiIUMUp are as follows:

Message ID‖Version_IUM$_A$‖RA_IUM‖AUA1

Description of contents of the protocol message: Version_IUM$_A$: IUM$_A$ version number stored in the A; RA_IUM: a random number, output by Rand(128); AUA1: a message authentication code.

AUA1=M_A(K_IUM‖(Version_IUM$_A$‖RA_IUM))

a2) waiting a response message (MesD_INBiIUMUp_Fail, Mes2_INBiIUMUp or MesD_INBiIUMUp_Request) returned from the B; setting, by the A, a max wait time T_INBiIUMUpDelay, and beginning timing:

if the message MesD_INBiIUMUp_Request returned from the B is read within the time T_INBiIUMUpDelay, implementing the next step;

if the message Mes2_INBiIUMUp returned from the B is read within the time T_INBiIUMUpDelay, implementing step a5);

if the message MesD_INBiIUMUp_Fail returned from the B is read within or T_INBiIUMUpDelay over the time, implementing step a9);

a3) transmitting a message Mes3_INBiIUMUp to a corresponding storage area of the B, and then implementing the next step;

Contents of a protocol message Mes3_INBiIUMUp are as follows:

Message ID‖IUM$_A$‖Cert_IUM$_A$_Adm‖RA_IUM‖AUA3

Description of contents of the protocol message: IUM$_A$: IUM version stored in the A with variable length; Cert_IUM$_A$_Adm: a CA certificate issuing the IUM$_A$; RA_IUM: a random number, output by Rand(128); AUA3: a message authentication code;

a4) waiting to receive a verification success message MesD_INBiIUMUp_Succeed returned from the B; setting, by the A, a max wait time T_INBiIUMUpDelay, and beginning timing, if the message MesD_INBiIUMUp_Succeed is received within the time T_INBiIUMUpDelay, implementing step a8), otherwise, implementing the step a9);

a5) verifying signatures of message authentication codes AUA2 and IUM$_B$ in the message Mes2_INBiIUMUp; if both verifications ① and ② pass, implementing the next step; otherwise implementing the step a9);

The verification processes ① and ② are as follows:

Implementing the verification ①: verifying whether the relation $$AUA2==M\_A(K\_IUM\|(IUM_B\|Cert\_IUM_B\_Adm\|RB\_IUM)) \text{ is valid;}$$

implementing the verification ②: calling a revocation list verification module to verify validity of the newly received signature in the revocation list of the device B;

a6) replacing the original IUM$_A$‖Cert_IUM$_A$_Adm with the IUM$_B$‖Cert_IUM$_B$_Adm, and implementing the next step after the replacement;

a7) transmitting a message MesS_INBiIUMUp_Succeed to the B, and then implementing the step a8);

Contents of a protocol message contained in the message MesS_INBiIUMUp_Succeed are as follows:

Message ID‖SUCCEED a8) setting the flag bits in a corresponding state register $R_{MU}$ in the A as IUC=1 and IUS=1, and implementing the corresponding link revocation list update protocol successfully;

a9) checking whether frequency of the continuous local update failures is less than a specified frequency: adding 1 to the frequency of update failures, and re-initiating the IUM update process with the B if the frequency of the continuous local update failures is less than the specified frequency; otherwise setting flag bits in a corresponding state register $R_{IN}$ in the A as IUC=1 and IUS=0, and failing to implement the corresponding link IUM update protocol.

b) Performing, by the responder B, the following processes successively during the two-way IUM update process:

b1) Reading the Mes1_INBiIUMUp, and then successively implementing the next step;

b2) verifying whether the message authorization code AUA1 in the massage Mes1_INBiIUMUp is correct; re-computing the M_A hash value according to the contents of the message Mes1_INBiIUMUp, and comparing the computation result with the read AUA1: if the verification passes, implementing the next step; otherwise implementing step b12).

b3) comparing version number of the IUM$_A$ with that of the IUM$_B$: if the version number of the IUM$_A$ is greater, implementing the next step, otherwise implementing step b9);

b4) transmitting the message MesD_INBiIUMUp_Request to a corresponding storage area of the A, and then implementing the next step;

Contents of a protocol message MesD_INBiIUMUp_Request are as follows:

Message ID||REQUEST

Where, the value of a defined request flag REQUEST in the system is 1, with the length of 1 bit.

b5) waiting to read the message Mes3_INBiIUMUp returned from the A; setting, by the B, the maximum wait time T, and beginning timing, if the message Mes3_INBiIUMUp returned by the A is read within the time T_INBiIUMUpDelay, performing the next step; otherwise performing step b13);

b6) verifying signatures of the message authentication codes AUA3 and $IUM_A$ in the message Mes3_INBiIUMUp; if both verifications ③ and ④ pass, implementing the next step; otherwise implementing the step b13);

The verification processes ③ and ④ are as follows:

implementing the verification ③: verifying whether the relation $$AUA3 = M\_A(K\_IUM||IUM_A||Cert\_IUM_A\_Adm||RA\_IUM) \text{ is valid};$$

implementing the verification ④: calling the revocation list verification module to verify validity of the newly received signature in the revocation list of the device A.

b7) replacing the original $IUM_B$||Cert_$IUM_B$_Adm with the $IUM_A$||Cert_$IUM_A$_Adm, and implementing the next step after the replacement;

b8) transmitting the message MesD_INBiIUMUp_Succeed to the A, and then implementing step b11);

Contents of a protocol message MesD_INBiIUMUp_Succeed are as follows:

Message ID||SUCCEED b9) transmitting the message Mes2_INBiIUMUp to the A, and then implementing the next step;

Contents of a protocol message Mes2_INBiIUMUp are as follows:

Message ID||$IUM_B$||Cert_$IUM_B$_Adm||RB_IUM||AUA2

Description of contents of the protocol message: $IUM_B$: IUM version stored in the B; Cert_$IUM_B$_Adm: a CA certificate issuing the $IUM_B$; RB_IUM: a random number, output by Rand(128); AUA2: a message authentication code;

AUA2=M_A
(K_IUM||IUMB||Cert_IUMB_Adm||RB_IUM)

b10) waiting to read the verification success message MesS_INBiIUMUp_Succeed returned by the A; setting, by the B, the max wait time T_INBiIUMUpDelay, and beginning timing, if the message MesS_INBiIUMUp_Succeed is read within the time T_INBiIUMUpDelay, implementing the next step; otherwise implementing the step 13);

b11) setting the flag bits IUC and IUS in a corresponding state register $R_{MU}$ in the B as 1, and implementing the corresponding link IUM update protocol successfully;

b12) transmitting the message MesD_INBiIUMUp_Fail to the corresponding storage area of the A, and then implementing the next step;

Contents of a protocol message MesD_INBiIUMUp_Fail are as follows:

Message ID||FAIL checking whether frequency of continuous local update failures is less than a specified frequency: adding 1 to the frequency of the update failures, and waiting the A to re-initiate the IUM update process, if the frequency of the continuous local update failures is less than the specified frequency; otherwise setting flag bits in a corresponding state register $R_{IN}$ of the B as IUC=1 and IUS=0, and implementing the corresponding link IUM update protocol unsuccessfully.

The invention provides a content security transmission system, a device and a content security transmission method based on the system, which can implement the digital content security transmission between digital interfaces of home network and home terminal devices. In the case of transmission by the digital interface, the system can make full use of the characteristics of the terminal device digital interface chip and device master chip (or other special chips) to implement of the content transmission protection, decreasing the terminal cost effectively, and reducing the size of chip interfaces. The invention is suitable for content protection in high-speed digital interfaces, content protection in home network, other cases for content protection, and especially for chip development and software implementation.

The invention claimed is:

1. A content transmission security protection device, comprising memory, a digital interface, and characterized by further comprising a management/processing engine, the management/processing engine being configured in a specific chip in the content transmission security protection device;

the digital interface being used for performing an authentication between the management/processing engine and the digital interface at the request of the management/processing engine in the content transmission security protection device;

performing an authentication between the digital interface of the content transmission security protection device and a digital interface of a downstream receiver device;

performing a key activation between the content transmission security protection device and the downstream receiver device to obtain an encryption key, wherein the encryption key is used as an initial key to encrypt content data to be transmitted by the digital interface;

the management/processing engine being used for initiating an authentication between the management/processing engine and the digital interface in the content transmission security protection device;

performing an authentication between the management/processing engine of the content transmission security protection device and a management/processing engine of a downstream receiver device;

updating a revocation list stored in a local management/processing engine of the content transmission security protection device;

and collecting communication link data from said downstream receiver devices.

2. A content transmission security protection system, comprising a content transmission security protection device, a forwarding device and a a downstream receiver device, and characterized in that the content transmission security protection device comprises digital interfaces and a management/processing engine, and the downstream receiver device comprises digital interfaces and a presentation interface;

the digital interface of the content transmission security protection device comprising:

logic for performing an authentication between the management/processing engine and the digital interface at the request of the management/processing engine in the content transmission security protection device;

logic for performing an authentication between the digital interface of the content transmission security protection device and a digital interface of the downstream receiver device;

and logic for performing key activation between the content transmission security protection device and the downstream receiver device to obtain an encryption key, wherein the encryption is used as an initial key to encrypt data to be transmitted by the digital interface;

the management/processing engine of the content transmission security protection device comprising:

logic for initiating an authentication between the management/processing unit and the digital interface in the content transmission security protection device;

logic for performing authentication between the management/processing engine of the content transmission security protection device and a management/processing engine of a downstream receiver device;

and logic for-updating a revocation list stored in a local management/processing engine of the content transmission security protection device, and collecting communication link data from said downstream receiver devices;

and the presentation interface of the downstream receiver comprising:

logic for digital content usage and accepting user operations.

3. A content transmission security protection method, characterized by comprising the following steps: a. initiating, by a management/processing unit of a transmitter, an authentication between the management/processing unit of the transmitter and a digital interface of the transmitter; and initiating, by a management/processing unit of a receiver, an authentication between the management/processing unit the of receiver and a digital interface of the receiver; b. performing an authentication between the digital interface of the transmitter and the digital interface of the receiver; c. performing an authentication between the management/processing unit of transmitter and management/processing unit of the receiver; d. performing key activation between the digital interface of the transmitter and the digital interface of the receiver to obtain an encryption key; and e. using, by the digital interface of the transmitter, the encryption key as an initial key to encrypt contents of data and transmit the data to the digital interface of the receiver; and f. judging, by the management/processing unit of the transmitter, whether information collection is completed after the step c and before the step d, and collecting information if the information collection is not completed; judging whether revocation lists stored in the management/processing unit of the transmitter and the management/processing unit of the receiver are consistent, and updating the revocation list if the revocation lists stored in the management/processing unit of the transmitter and the management/processing unit of the receiver are not consistent; and proceeding to the step d if the information collection is completed and the revocation lists are consistent.

4. The content transmission security protection method of claim 3, characterized in that the authentication between the management/processing unit of the transmitter and the digital interface of the transmitter and the authentication between the management/processing unit of the receiver and the digital interface of the receiver are automatically performed when the transmitting device or the receiving device is electrified.

5. The content transmission security protection method of claim 3, characterized in that the authentications in the step a, b and c are performed by judging legality of public keys, particularly the authentication between the digital interface and the management/processing unit in the transmitter or receiver in the step a is implemented by judging the legality of a public key held by the digital interface and a public key held by the management/processing unit;

the authentication between the digital interface of the transmitter and the digital interface of the receiver in the step b is implemented by judging the legality of a public key held by the digital interface of transmitter and a public key held by the digital interface of the receiver; and the authentication between the management/processing unit of the transmitter and the management/processing unit of the receiver in step c is implemented by judging the legality of a public key held by the management/processing unit of the transmitter and a public key held by the management/processing unit of the receiver.

6. The content transmission security protection method of claim 5, characterized in that the authentication in the step b comprises:

b1. transmitting, by the digital interface of the receiver, the public key of the transmitting digital interface and a random number of the receiving digital interface to the transmitting digital interface;

b2. handing, by the transmitting digital interface, the public key of the receiving digital interface over to the management/processing unit of the transmitter, then judging, by the management/processing unit of the transmitter, whether the pubic key of the receiving digital interface exists in the revocation list stored in the management/processing unit of the transmitter, and the authentication failing if the public key of the receiving digital interface exists in the revocation list stored in the management/processing unit of the transmitter;

and transmitting, by the transmitting digital interface, the public key of the transmitting digital interface and a random number of the transmitting digital interface to the receiving digital interface if the public key of the receiving digital interface does not exist in the revocation list stored in the management/processing unit of the transmitter;

b3. handing, by the receiving digital interface, the public key of the transmitting digital interface over to the management/processing unit of the receiver, and judging, by the management/processing unit of the receiver, whether the public key of the transmitting digital interface exists in the revocation list stored in the management/processing unit of the receiver, and the authentication failing if the public key of the transmitting digital interface exists in the revocation list stored in the management/processing unit of the receiver;

and generating, by the transmitting digital interface, a master key of the transmitting digital interface according to a private key of the transmitting digital interface, the public key of the receiving digital interface, the random number of the transmitting digital interface and the random number of the receiving digital interface; and generating, by the receiving digital interface, a master key of the receiving digital interface according to a private key transmitted to the receiving digital interface, the public key of the transmitting end digital interface, the random number of the transmitting digital interface and the random number of the receiving digital interface if the public key of the transmitting digital interface does not exist in the revocation list stored in the management/processing unit of the receiver; and b4. judging whether the master key of the transmitting digital interface is the same as that of the receiving digital interface, the authentication succeeding if the master key of the transmitting digital interface is the same as that of the receiving digital interface, and the authentication failing if the master key of the transmitting digital interface is different from that of the receiving digital interface.

7. The content transmission security protection method of claim 6, characterized in that data transmission in the authentication between the management/processing unit of the transmitter and the management/processing unit of the receiver in the step c relies on a communication link established during the authentication between the transmitting digital interface and the receiving digital interface in step b.

8. The content transmission security protection method of claim 3, characterized in that the information collection includes collection of capacity, link depth and link hierarchy of downstream receiver devices.

9. The content transmission security protection method of claim 8, characterized in that bit or operation results of the capacity of the downstream receiver devices are expressed by capacity fields of local devices and capacity fields stored in management/processing units of all directly linked downstream receiver devices, wherein the capacity fields of the local devices are written in the local devices during production.

10. The content transmission security protection method of claim 3, characterized in that synchronous key check and key update are regularly carried out in the step e, and data content encryption and keys update are carried out in a parity key manner.

\* \* \* \* \*